US008124177B2

(12) United States Patent
Tonkovich et al.

(10) Patent No.: US 8,124,177 B2
(45) Date of Patent: Feb. 28, 2012

(54) TAILORED AND UNIFORM COATINGS IN MICROCHANNEL APPARATUS

(75) Inventors: Anna Lee Tonkovich, Marysville, OH (US); Barry L. Yang, Dublin, OH (US); Terry Mazanec, Solon, OH (US); Francis P. Daly, Delaware, OH (US); Sean P. Fitzgerald, Columbus, OH (US); Ravi Arora, Dublin, OH (US); Dongming Qiu, Bothell, WA (US); Bin Yang, Columbus, OH (US); Steven T. Perry, Galloway, OH (US); Kai Jarosh, Bexley, OH (US); Paul W. Neagle, Westerville, OH (US); David J. Hesse, Columbus, OH (US); Rachid Taha, Dublin, OH (US); Richard Long, New Albany, OH (US); Jeff Marco, South Charleston, OH (US); Thomas D. Yuschak, Lewis Center, OH (US); Jeffrey J. Ramler, Lewis Center, OH (US); Mike Marchiando, London, OH (US)

(73) Assignee: Velocys, Plain City, OH (US)

( * ) Notice: Subject to any disclaimer, the term of this patent is extended or adjusted under 35 U.S.C. 154(b) by 2223 days.

(21) Appl. No.: 11/089,440

(22) Filed: Mar. 23, 2005

(65) Prior Publication Data
US 2005/0244304 A1    Nov. 3, 2005

Related U.S. Application Data

(60) Provisional application No. 60/556,014, filed on Mar. 23, 2004.

(51) Int. Cl.
B05D 7/22    (2006.01)
(52) U.S. Cl. .................................. 427/239; 427/232
(58) Field of Classification Search .................. None
See application file for complete search history.

(56) References Cited

U.S. PATENT DOCUMENTS
3,944,505 A    3/1976 LaCroix
(Continued)

OTHER PUBLICATIONS

Janicke, Michael T., et al. The controlled oxidation of hydrogen from an explosive mixture of gases using a microstructured reactor/heat exchanger and Pt/Al2O3 catalyst, 2000, Journal of Catalysis, vol. 191, pp. 282-293.*

(Continued)

*Primary Examiner* — Yelena G Gakh
*Assistant Examiner* — Robert Xu
(74) *Attorney, Agent, or Firm* — Frank Rosenberg

(57) ABSTRACT

Interior microchannels within microchannel apparatus are uniformly coated. Remarkably, these uniform coatings are formed from materials that are applied to the interior microchannels after an apparatus has been assembled or manufactured. Coatings can be made uniform along the length of a microchannel, in the corner of a microchannel, and/or throughout numerous microchannels in an array of microchannels. Techniques for tailoring the application of washcoats onto microchannels is also described.

20 Claims, 23 Drawing Sheets

U.S. PATENT DOCUMENTS

| | | | |
|---|---|---|---|
| 4,125,776 A | | 11/1978 | Tosswill et al. |
| 4,294,871 A | | 10/1981 | Hieber et al. |
| 4,888,320 A | | 12/1989 | Ihara et al. |
| 4,996,080 A | * | 2/1991 | Daraktchiev .................. 427/600 |
| 5,165,970 A | | 11/1992 | Schmidt et al. |
| 5,199,487 A | | 4/1993 | DiFrancesco et al. |
| 5,202,303 A | | 4/1993 | Retallick et al. |
| 5,308,457 A | | 5/1994 | Dalla Betta et al. |
| 5,368,888 A | | 11/1994 | Rigney |
| 5,866,210 A | | 2/1999 | Rosynsky et al. |
| 6,361,824 B1 | | 3/2002 | Yekimov et al. |
| 6,508,862 B1 | | 1/2003 | Tonkovich et al. |
| 6,562,404 B1 | | 5/2003 | Folta et al. |
| 2002/0060153 A1 | * | 5/2002 | Elpel ............................ 204/451 |
| 2003/0153455 A1 | | 8/2003 | Wang et al. |
| 2004/0076562 A1 | | 4/2004 | Manzanec et al. |
| 2004/0123626 A1 | | 7/2004 | Caze et al. |
| 2005/0271563 A1 | | 12/2005 | Yang et al. |
| 2006/0016215 A1 | | 1/2006 | Tonkovich et al. |
| 2006/0016216 A1 | | 1/2006 | Tonkovich et al. |
| 2006/0142401 A1 | | 6/2006 | Tonkovich et al. |
| 2006/0249020 A1 | | 11/2006 | Tonkovich |
| 2007/0085227 A1 | | 4/2007 | Tonkovich et al. |
| 2007/0259109 A1 | | 11/2007 | Sorndal |

OTHER PUBLICATIONS

Office Action from Chinese Patent Office (English Translation), dispatched Dec. 12, 2008 in Chinese Patent Application No. 200580016106.

Written Opinion of the International Searching Authority, PCT/US2005/010045, mailed Oct. 5, 2006.

International Search Report, PCT/US2005/010045, mailed Dec. 15, 2005.

Valentini et al., "The deposition of Al2O3 layers on ceramic and metallic supports for the preparation of structured catalysts," Catalysis Today 69 (2001) 307-314.

Bednarova et al., "Preferential oxidation of CO in a microreactor with a single channel," Prepr. Pap.-Am Chem. Soc., Div. Fuel Chem. 2003, 48(2).

Rebrov et al., "The preparation of highly ordered single layer ZSM-5 coating on prefabricated stainless steel microchannels," Applied Catalysis A: General 206 (2001) 125-143.

Zapf et al., "Detailed Characterization of various porous alumina-based catalyst coatings within microchannels and their testing for methanol steam reforming," Trans IChemE, vol. 81, Part A, Aug. 2003, 721-729.

Wan et al., "1-Pentene epoxidation in titanium silicalite-1 microchannel reactor: experiments and modelling," Trans IChemE, vol. 81, Part A, Aug. 2003, 1-7.

* cited by examiner

TAILORED AND UNIFORM COATINGS IN MICROCHANNEL APPARATUS

RELATED APPLICATIONS

In accordance with 35 U.S.C. sect. 119(e), this application claims priority to U.S. Provisional Application No. 60/556,014, filed Mar. 23, 2004.

FIELD OF THE INVENTION

This invention relates to microchannel apparatus having interior microchannels that have coatings which are applied after the apparatus has been assembled or manufactured to form the interior microchannels.

Introduction

In recent years there has been tremendous academic and commercial interest in microchannel devices. This interest has arisen due to the advantages from microtechnology including reduced size, increased productivity, the ability to size systems of any desired capacity (i.e., "number-up" channels), increased heat transfer, and increased mass transfer. A review of some of the work involving microreactors (a subset of microchannel apparatus) has been provided by Gavrilidis et al., "Technology And Applications Of Microengineered Reactors," Trans. IChemE, Vol. 80, Part A, pp. 3-30 (January 2002).

Microchannel apparatus can be made of a variety of materials including ceramics, plastics, and metals. In many applications, process channels in microchannel apparatus require a coating or coatings over the structural material. The coatings can serve purposes such as absorption, adsorption, physical barrier to the metal wall for purposes of metal passivation for unwanted interactions or depositions, a membrane, and catalysis. In some cases, microchannels are slurry coated or sol coated; for example, an oxide coat applied to a ceramic honeycomb. In some cases, sheets of a material are coated and then assembled and bonded to form a multilayer microchannel device.

One problem that has been recognized for some time is non-uniform coatings on microchannel walls. For conventional processes, such as dip coating, capillary action results in excess coatings in channel corners. As pointed out by Spencer in U.S. Pat. No. 5,827,577 (filed in November 1996), uneven catalyst coatings result in reduced catalyst performance and thermal shock failure. Spencer addressed this problem by imprinting a catalyst or adsorbent composition onto sheets that may be subsequently rolled into a honeycomb or monolith poluution treating device.

Zapf et al. in "Detailed Characterization of Various Porous Alumina-Based Catalyst Coatings Within Microchannels and Their Testing for Methanol Steam Reforming," Trans. IChemE, pp 721-729 (August 2003) remarked that literature reports so far showed non-uniform coating profiles in both semi-circular and rectangular channels. In their own studies on alumina washcoats onto microchannels etched into an open-faced plate, they reported a thickness of an alumina washcoating that was 20 µm in the center and 70 µm near the channel walls or corners for microchannels that were 500 and 750 µm wide. The smallest differences in washcoat thickness were observed for shallow channels with a depth of 70 µm—10-15 µm at the channel center and 15-20 µm at the channel wall.

Wan et al. in "1-Pentene Epoxidation in Titanium Silicate-1 Microchannel Reactor: Experiments and Modeling," Trans. IChemE, pp 1-7 (August 2003) reported a technique for selectively depositing zeolite layers into microchannels. This technique required etching a silicon substrate, followed by functionalization of the etched surface, seeding and zeolite growth on the prepared surfaces.

Bednarova et al. in "Preferential oxidation of CO in a microreactor with a single channel," Am. Chem. Soc., Div. Fuel Chem. 2003, 48(2), showed an open-face microreactor with an alumina/Pt layer formed by a sol-gel technique. Although the authors described the coating as "fairly uniform" the photograph of the cross-section appeared to show substantially non-uniform coatings.

Since one aspect of the present invention includes aluminide coatings, reference can be made to early work described by LaCroix in U.S. Pat. No. 3,944,505. This patent describes a catalytic device made of a stack of expanded metal sheets (such as Inconel). The metal sheets carry a layer of a nickel or cobalt aluminide and a layer of alpha alumina on the aluminide, and a catalytic surface on the aluminide. LaCroix did not describe how the aluminide layer was formed on the sheets, nor did LaCroix provide any data describing the aluminide layer.

Methods of forming aluminide coatings are well known and have been utilized commercially for coating certain jet engine parts. Methods of making aluminide coatings from aluminum halides are described in, for example, U.S. Pats. Nos. 3,486,927 and 6,332,926.

There have been attempts to apply aluminide coatings on interior channels of gas turbine airfoils. Rigney et al. in U.S. Pat. No. 6,283,714 reported coating internal cooling passages of turbine blades with an aluminide coating using a slurry/pack process. Rigney et al. also stated that an aluminum halide gas could be passed through the cooling passages at high temperature so that an aluminide coating about 0.002 inch (50 µm) thick may be deposited in about 4 to 8 hours. Pfaendter et al. in U.S. Pat. No. 6,332,926 also suggests flowing an aluminum-coating precursor to deposit aluminum onto an internal airfoil surface.

Howard et al. in U.S. Pat. No. 5,928,725 entitled "Method and Apparatus for Gas Phase Coating Complex Internal Surfaces of Hollow Articles," reviewed prior art methods of gas phase coating for coating internal surfaces but remarked that the prior art methods were ineffective for coating multiple gas passages of modern airfoils and result in non-uniform internal coatings. In the process described in this patent, the coating gas flow rate is controlled to a different rate into at least two channels. Howard et al. state that a coating mixture including aluminum powder, aluminum oxide and aluminum flouride could be heated to deliver a coating gas. This improved method was reported to result in an aluminide coating thickness of 1.5 mils±1.0 mil.

Folta et al. in U.S. Pat. No. 6,562,404 described a technique for coating silicon microflow devices with a conformal layer of silicon nitride (SiN). This technique uses vacuum chemical vapor deposition (CVD) of dichlorosilane and ammonia at temperatures of 775-875° C. to produce crack-free SiN films with thicknesses of 1-2 µm. Folta et al. claimed that this technique had "the ability to uniformly coat deeply recessed cavities with aspect ratios of 40:1 or higher." They demonstrated the technique on a silicon structure with a 8.2 mm long channel, with a 0.1 mm height that was open at both ends. Folta et al. reported that the SiN coating on the exterior of the device was 138 nm thick and a uniform thickness of 115 nm within the channel, with the surfaces of the tapered ports having an intermediate thickness. Folta's technique appears to provide good surface protection for some relatively simple silicon devices; however, the technique appears to have several limitations, including: it is specific to SiN-coated silicon and, for example, does not appear capable of providing a uniform oxide coating; the technique does not appear applicable for applying uniform coatings to complex structures, for example channels with sharp bends; there is no indication of the coating uniformity at microchannel corners; and the technique is shown to result in thicker coatings on exterior surfaces—this could cause flow problems and even occlusions at the inlets/outlets of some microchannel apparatus.

It is believed that conventional CVD techniques are unlikely to produce uniform coatings within microchannels because thicker coatings would be expected near channel openings and in features such as sharp turns and orifices, and in channel corners. The coatings described above by Folta et al. appear exceptionally uniform for a CVD process, but even in that case there was greater thickness on the device's exterior and in the ports leading to the microchannel.

Electroless metal coatings have long been known and are reviewed by Mallory et al. eds., "Electroless Plating Fundamentals & Applications," American Electroplaters Society (1990) and Chepuri et al., "Chemical and electrochemical depositions of platinum group metals and their applications," Coord. Chem. Rev., vol. 249, pp. 613-631 (2005). Yekimov et al., in U.S. Pat. No. 6,361,824 reported the electroless coating of silver on microchannels through a very thin glass sheet. The microchannels could be 50 to 1000 microns ($\mu m$) in length. It was reported that the microchannels must by horizontally aligned during coating. Yekimov et al. also reported that to avoid clogging, the upper and lower surfaces of the glass plate needed to be unobstructed. Even with limiting the microchannel to these extremely short lengths, the coating of metallic silver was reported to be 30 to 50 nm thick.

As described below, the present invention provides novel microchannel apparatus having uniform or tailored coatings and novel methods of making these coatings. The invention also includes methods of conducting unit operations through microchannel devices with coated microchannels.

SUMMARY OF THE INVENTION

In a first aspect, the invention provides microchannel apparatus, comprising: an interior microchannel comprising a microchannel wall; and a contiguous post-assembly coating along a contiguous length of at least 1 cm of the microchannel wall. The contiguous post-assembly coating has a contiguous length of at least 1 cm that has an average thickness (measured perpendicular to the microchannel length and in the direction in which a coating grows away from the wall) of at least 5 $\mu m$ and wherein at least 90% of the contiguous length of coating is within +/−20% of the average thickness. In every aspect mentioned herein, the at least 1 cm coating lengths can, in some preferred embodiments, be at least 5, at least 20, or at least 50 cm. Likewise, in every aspect mentioned herein, the at least 90% can, in some preferred embodiments, be at least 95%, or 100%. Also, in every aspect mentioned herein, the within +/−20% can, in some preferred embodiments, be within 10% or within 5%. In various embodiments of each aspect, coatings can be at least 5 $\mu m$ thick, or at least 15 $\mu m$ thick, or at least 25 $\mu m$ thick. Also, in place of percent variance, coating thickness variability can be defined in absolute values of ±5 $\mu m$ or less, or ±3 $\mu m$ or less.

In some preferred embodiments, the microchannel apparatus is provided with a uniform coating, by CVD of aluminum compounds and formation of an aluminide layer.

In another aspect, the invention provides a method of applying a washcoat onto a microchannel wall, comprising: providing a microchannel apparatus comprising a microchannel defined by at least one microchannel wall, wherein the at least one microchannel wall comprises capillary features; adding a washcoating liquid to the microchannel and contacting the capillary features; and draining the washcoating liquid from the microchannel. The capillary features do not include a contiguous path over the entire length of the microchannel.

In a further aspect, the invention provides microchannel apparatus, comprising: an interior, complex microchannel comprising a microchannel wall; and a contiguous post-assembly coating along a contiguous length of at least 1 cm of the microchannel wall. The contiguous post-assembly coating has a contiguous length of at least 1 cm that has an average thickness (measured perpendicular to the microchannel length and in the direction in which a coating grows away from the wall) of at least 1 $\mu m$ and at least 90% of the contiguous length of coating is within +/−20% of the average or mean thickness.

In another aspect, the invention provides microchannel apparatus, comprising: an interior microchannel comprising a microchannel wall; and a contiguous post-assembly alumina coating along a contiguous length of at least 1 cm of the microchannel wall. The contiguous post-assembly coating has a contiguous length of at least 1 cm that has an average thickness (measured perpendicular to the microchannel length and in the direction in which a coating grows away from the wall) of at least 1 $\mu m$ and at least 90% of the contiguous length of coating is within +/−20% of the average thickness.

In yet another aspect, the invention provides microchannel apparatus, comprising: a plurality of parallel interior microchannels sharing a common manifold; wherein each microchannel comprises a metallic wall; and a contiguous post-assembly coating along a contiguous length of at least 1 cm of the metallic wall of at least 90% of the microchannels in the plurality of microchannels. The contiguous post-assembly coating has a contiguous length of at least 1 cm that has an average thickness (measured perpendicular to the microchannel length and in the direction in which a coating grows away from the wall) of at least 1 $\mu m$, and the contiguous post-assembly coating in each of the microchannels in the at least 90% of the microchannels in the plurality of microchannels has a length and coating loading that is within +/−20% of the average length and coating loading for the plurality of parallel interior microchannels sharing a common manifold.

In yet another aspect, the invention provides microchannel apparatus, comprising: a plurality of parallel interior microchannels sharing a common manifold; wherein each microchannel of the plurality of parallel interior microchannels comprises a microchannel wall; and a contiguous post-assembly coating along a channel length of at least 5 cm of the microchannel wall of at least 90% of the microchannels in the plurality of microchannels wherein the post-assembly coating has a first average thickness over the first 20% of axial length of the contiguous post-assembly coating (measured perpendicular to the microchannel length and in the direction in which a coating grows away from the wall) of at least 1 $\mu m$, and a second average thickness over the last 20% of axial length of the contiguous post-assembly coating (measured perpendicular to the microchannel length and in the direction in which a coating grows away from the wall) of at least 1 $\mu m$, wherein the first 20% of the contiguous post-assembly coating and the last 20% of the contiguous post-assembly coating have coating loadings that are within 20% of each other in the at least 90% of the microchannels in the plurality of microchannels of parallel interior microchannels sharing a common manifold. The first 20% and the last 20% can be arbitrarily selected, this language merely refers to the beginning and end of a continguous coating in a microchannel. In the plurality of parallel microchannels, these coatings are averaged and the coating loading at one end of the plurality of microchannels is about the same (within 20%) as at the other end. In a preferred washcoating procedure, the second 20% is oriented above the first 20% (with respect to gravity) and the microchannel wall on which the second 20% is disposed comprises capillary features.

In a further aspect, the invention provides a method of washcoating a microchannel device, comprising: adding a liquid coating composition into a plurality of parallel interior microchannels sharing a common manifold; draining the liquid from the plurality of parallel interior microchannels sharing a common manifold; and further comprises at least one step of: (a) wicking liquid out from the plurality of parallel interior microchannels sharing a common manifold; (b) removing liquid from the plurality of parallel interior microchannels sharing a common manifold with a purging of gas flow that is of sufficiently low flow so that flow through any microchannel in the plurality of parallel interior microchannels sharing a common manifold is within 50% of that of the average flow through each of the microchannels in the plurality of parallel interior microchannels sharing a common manifold; or (c) applying vacuum to a subset of the plurality of parallel interior microchannels sharing a common manifold.

In another aspect, the invention provides a method of applying a uniform metal coating onto a microchannel wall of an interior microchannel, comprising: filling an interior microchannel to a desired height with an electroless plating liquid; allowing the liquid to remain in the interior microchannel while a metal plates onto a wall or walls of the microchannel; and then cooling the liquid prior to draining to reduce the rate of reaction, or reacting the electroless plating solution within the microchannel until one of the essential reactants is substantially depleted within the microchannel; and then draining the liquid from the microchannel.

In a further aspect, the invention provides microchannel apparatus, comprising: an interior microchannel comprising at least one microchannel wall; wherein the interior microchannel comprises at least two corners having angles of at least 45° and at least one flat area between the corners; and a post-assembly coating. The post-assembly coating comprises a corner thickness that is measured along a line bisecting the corner angle; wherein the post-assembly coating comprises a coating on the flat area having a flat area coating thickness; and wherein the corner thickness is no more than 50% greater than the flat area coating thickness. Alternatively, the average thickness ((d1+d2)/2) of the coating at the perimeter of the corner coating (see FIG. 13b) based on extensions (d1 and d2) of 100 µm lines used to measure coating angle; preferably this thickness of the coating at the perimeter of the corner coating is within 25%, more preferably within 10% of either the average coating thickness (averaged over a microchannel wall, or 100 µm microchannel wall segment, terminating at the corner), or within 25%, more preferably within 10% of the midpoint thickness (either measured at the midpoint of a microchannel wall, or at the midpoint of a 100 µm microchannel wall segment, terminating at the corner).

In another aspect, the invention provides microchannel apparatus, comprising: a corner crevice in an interior microchannel; a post-assembly coating that substantially fills the crevice to form a crevice fill; two substantially perpendicular microchannel walls comprising a first substantially flat microchannel wall having a substantially flat post-assembly coating disposed thereon and a second microchannel wall that is substantially perpendicular to the first microchannel wall; and an interface between the post-assembly coating on the first substantially flat microchannel wall and an open microchannel. A surface of the crevice fill forms an interface with the open microchannel, and the surface of the crevice fill is at or below the level of interface between the post-assembly coating on the first substantially flat microchannel wall and an open microchannel, relative to the direction of post-assembly coating growth from the first substantially flat microchannel wall. This aspect should be understood with reference to the SEM photomicrograph. In a preferred embodiment, the first microchannel wall and the second microchannel wall are bonded to each other by diffusion bonding or brazing.

In another aspect, the invention provides microchannel apparatus, comprising: a plurality of discontinuous recessed or protruded capillary features whose protruded or recessed depth is less than 40% of the minimum dimension of the microchannels in which the capillary features are disposed; wherein the capillary features are contained within at least three or more parallel microchannels; and wherein the capillary features have at least one dimension less than 1 mm. Preferably, there is at least 40% more mass of washcoat material on areas having capillary feature than on flat areas of the microchannel walls. In a related aspect, the invention provides methods of forming capillary features comprising laser cutting, roll forming, electrodischarge machining, photochemical machining, and/or laser ablation.

In another aspect, the invention provides a method of precisely filling multimicrochannels in a multichannel, microchannel device, comprising: orienting a multichannel, microchannel device with respect to gravity such that long axes of the microchannels in the device, in a selected region of the device, are oriented parallel to gravity; adding liquid from a liquid source into multiple microchannels in the selected region of the device; and monitoring liquid level in the device by use of a watch tube in communication with the microchannel device or the liquid source. In a preferred embodiment, the liquid flows through an inlet at the device bottom, into a manifold and then into the multiple microchannels, and liquid level is adjusted to a desired height by use of the watch tube.

Aluminide coatings in microchannels can be made by passing gaseous aluminum compounds over metal surfaces (especially a metal wall of a microchannel) and simultaneously or subsequently reacting with a metal in the substrate to form a surface layer of metal aluminide—this process is termed aluminization, perhaps more accurately, aluminidization. Conditions for aluminidization are conventionally known for jet engine parts, and the conventional steps are not described here. Certain steps such as excluding oxygen, controlling flow, and passage through manifolds are discussed in greater detail below.

In one aspect, the invention provides a method of forming a catalyst that comprises the steps of: (1) depositing a layer of Al, (2) forming a layer of metal aluminide on a metal alloy; (3) oxidizing the metal aluminide to form an alumina scale (4) optionally coating with a metal oxide sol (or metal oxide slurry); and (5) adding a catalyst material (typically by impregnation). Preferably the metal oxide sol or slurry is an alumina sol (here, alumina sol means a sol that after being deposited and heated, forms alumina) or alumina slurry. The invention also includes each of the individual steps or any combination thereof. For example, steps (1) and (2), deposition of Al and formation of a metal aluminide can be accomplished in a single step. In another example, steps (4) and (5), coating with a catalyst precursor sol, and addition of a catalyst metal, can be incorporated into a single step.

The invention further includes microchannel apparatus that is treated by any of the inventive methods; for example, the invention includes microchannel apparatus that comprises a uniform or tailored coating, or an apparatus that is made by oxidizing a nickel aluminide or applying a wash coat. The invention also includes the optional coating of pipes, tubes, or other structures attached to the microchannel apparatus.

The invention also includes methods for catalytic chemical conversion, such method comprising flowing a reactant fluid composition into a microchannel, wherein a catalyst composition is present in the microchannel, and reacting the reactant fluid composition into a desired product (or products) in the microchannel. The invention further includes methods for catalytic chemical conversion comprising contacting at least one reactant with an inventive catalyst. The invention also includes methods of conducting unit operations using any of the apparatus described herein.

The inventive methods are broadly applicable to wash coating compositions and coating compositions are well-known for a wide variety of desired coatings. Preferred coatings of the present invention include catalyst, passivation layer, or adsorbent coatings. A preferred coating composition is alumina sol.

Glossary of Terms Used

"Capillary features" are features associated with a microchannel that are used to hold liquid substances. They are either recessed within a wall of a microchannel or protrude from a wall of the microchannel into the flow path that is adjacent to the microchannel wall. The features create a spacing that is less than 1 mm, more preferably 250 microns or less, still more preferably a spacing of 100 μm or less. The features have at least one dimension that is smaller than any dimension of the microchannel in which they are situated.

A "catalyst material" is a material that catalyzes a desired reaction. It is not alumina. A catalyst material may include metals, metal oxides, and acidic sites.

A "catalyst metal" is the preferred form of catalyst material and is a material in metallic form that catalyzes a desired reaction. Particularly preferred catalyst metals are Pd, Rh and Pt.

A "chemical unit operation" comprises reactions, separations, heating, cooling, vaporization, condensation, and mixing.

A "complex microchannel" is in apparatus that includes one or more of the following characteristics: at least one contiguous microchannel has a turn of at least 45°, in some embodiments at least 90°, in some embodiments a u-bend, a length of 50 cm or more, or a length of 20 cm or more along with a dimension of 2 mm or less, and in some embodiments a length of 50-500 cm; at least 2 adjacent channels, having an adjacent length of at least one cm, are connected by plural orifices along a common microchannel wall where the area of orifices amounts to 20% or less of the area of the microchannel wall in which the orifices are located and where each orifice is 2 mm$^2$ or smaller, in some embodiments 1 mm$^2$ or smaller, in some embodiments 0.6 or 0.1 mm$^2$ or smaller—this is a particularly challenging configuration because a coating should be applied without clogging the holes; or at least two, in some embodiments at least 5, parallel microchannels having a length of at least 1 cm, have openings to an integral manifold, where the manifold includes at least one dimension that is no more than three times the minimum dimension of the parallel microchannels (for example, if one of the parallel microchannels had a height of 1 mm (as the smallest dimension in the set of parallel microchannels), then the manifold would possess a height of no more than 3 mm). An integral manifold is part of the assembled device and is not a connecting tube. A complex microchannel is one type of interior microchannel.

A "contiguous microchannel" is a microchannel enclosed by a microchannel wall or walls without substantial breaks or openings—meaning that openings (if present) amount to no more than 20% (in some embodiments no more than 5%, and in some embodiments without any openings) of the area of the microchannel wall or walls on which the opening(s) are present.

The phrase a "coating grows away from the wall" refers to the direction that a coating grows—either by thermal oxidation or an accretion process such as washcoating.

An "interior microchannel" is a microchannel within a device that is surrounded on all sides by a microchannel wall or walls except for inlets and outlets, and, optionally, connecting holes along the length of a microchannel such as a porous partition or orifices such as connecting orifices between a fuel channel and an oxidant channel. Since it is surrounded by walls, it is not accessible by conventional lithography, conventional physical vapor deposition, or other surface techniques.

An "insert" is a component that can be inserted into a channel either before or after assembly of the reactor or separator.

"Interior microchannel" refers to a microchannel that is bounded on all sides by a microchannel wall or walls except for inlets and outlets, and, optionally, connecting holes along the length of a microchannel such as a porous partition or orifices such as connecting orifices between a fuel channel and an oxidant channel. Since it is surrounded by walls, it is not accessible by conventional lithography, conventional physical vapor deposition, or other surface techniques.

A "manifold" is a header or footer that connects plural microchannels and is integral with the apparatus.

Measurement techniques—For all coatings, "average thickness" can be measured by cross-sectional microscopy (obtained by cutting open a microchannel device) or, for coatings that are about 5 μm thick or less, by EDS elemental analysis. In the case of channels connected to a common manifold or otherwise connected to be filled from the same inlet, the "average thickness" is averaged over all the channels, or for a large number of connected channels, at least 10 channels selected to fairly represent the totality of the connected channels. Measurements should be made over the entire length of a continguous coating; that is, not just for 1 cm selected out of a larger contiguous coating. "Coating loading" is measured the same as average thickness except that height and/or thickness (or elemental analysis) of the coating is measured to get a volume or mass. Unless specified as a corner measurment, average coating thickness should be measured along the center line between corners (if present), and any set of corners can be selected. Corner thickness can be measured on a single corner; however, the corner must be representative (not an aberration).

"Metal aluminide" refers to a metallic material containing 10% or more Metal and 5% or greater Aluminum (Al) with the sum of Metal and Al being 50% or more. These percentages refer to mass percents. Preferably, a metal aluminide contains 50% or more Metal and 10% or greater Al with the sum of Ni and Al being 80% or more. In embodiments in which Metal and Al have undergone significant thermal diffusion, it is expected that the the composition of a Metal-Al layer will vary gradually as a function of thickness so that there may not be a distinct line separating the Metal-Al layer from an underlying Metal-containing alloy substrate. The term "aluminide" is used synonamously with metal aluminide.

A preferred metal aluminide is nickel aluminide (NiAl). "Nickel aluminide" refers to a material containing 10% or more Ni and 5%, more preferably 10% or greater Al with the sum of Ni and Al being 50% or more. These percentages refer to mass percents. Preferably, a nickel aluminide contains 20% or more Ni and 10% or greater Al with the sum of Ni and Al being 80% or more. In embodiments in which Ni and Al have undergone significant thermal diffusion, it is expected that the the composition of a Ni—Al layer will vary gradually as a function of thickness so that there may not be a distinct line separating the Ni—Al layer from an underlying Ni-based alloy substrate.

"Ni-based" alloys are those alloys comprising at least 30%, prefearbly at least 45% Ni, more preferably at least 60% (by mass). In some preferred embodiments, these alloys also contain at least 5%, preferably at least 10% Cr.

A "post-assembly" coating is applied onto three dimensional microchannel apparatus. This is either after a laminating step in a multilayer device made by laminating sheets or subassemblies, or after manufacture of a manufactured multilevel apparatus such as an apparatus in which microchannels are drilled into a block. This "post-assembly" coating can be contrasted with apparatus made by processes in which sheets are coated and then assembled and bonded or apparatus made by coating a sheet and then expanding the sheet to make a three-dimensional structure. For example, a coated sheet that is then expanded may have uncoated slit edges. The post-assembly coating provides advantages such as crack-filling and ease of manufacture. Additionally, the aluminide or other coating could interfere with diffusion bonding of a stack of coated sheets and result in an inferior bond since aluminide is not an ideal material for bonding a laminated device and may not satisfy mechanical requirements at high temperature. Whether an apparatus is made by a post-assembly coating is detectable by observable characteristics such as gap-filling, crack-filling, elemental analysis (for example, elemental composition of sheet surfaces versus bonded areas) Typically, these characterisitics are observed by optical microscopy, electron microscopy or electron microscopy in conjunction with elemental analysis. Thus, for a given apparatus, there is a difference between pre-assembled and post-assembled coated devices, and an analysis using well-known analytical techniques can establish whether a coating was applied before or after assembly (or manufacture in the case of drilled microchannels) of the microchannel device.

A "separator" is a type of chemical processing apparatus that is capable of separating a component or components from a fluid. For example, a device comprising an adsorbent, absorbent, distillation or reactive distillation apparatus, etc.

The phrase "substantially depleted within the microchannel" means that the reactant(s) are consumed such that if a slow draining process were conducted at the reactoin temperature, the draining process would not result in a substantially non-uniform (>20% variation) coating thickness. Preferably, more than 90% of one essential reactant has been reacted.

BRIEF DESCRIPTION OF THE FIGURES

FIG. 6a is the shape of the meniscus in horizontal groove as predicted by 1-D model assuming a 5 mm deep by 5 mm wide channel, a 45 degree contact angle, and a gravity factor of 1. FIG. 6b is the shape of the meniscus in horizontal groove as predicted by 1-D model assuming a 0.125 mm deep by 0.5 mm wide channel, an 80 degree contact angle, and a gravity factor of 10.

DESCRIPTION OF THE INVENTION

Microchannel Apparatus

Microchannel reactors are characterized by the presence of at least one reaction channel having at least one dimension (wall-to-wall, not counting catalyst) of 1.0 cm or less, preferably 2.0 mm or less (in some embodiments about 1.0 mm or less) and greater than 100 nm (preferably greater than 1 µm), and in some embodiments 50 to 500 µm. A catalytic reaction channel is a channel containing a catalyst, where the catalyst may be heterogeneous or homogeneous. A homogeneous catalyst may be co-flowing with the reactants. Microchannel apparatus is similarly characterized, except that a catalyst-containing reaction channel is not required. Both height and width are substantially perpendicular to the direction of flow of reactants through the reactor. Microchannels are also defined by the presence of at least one inlet that is distinct from at least one outlet—microchannels are not merely channels through zeolites or mesoporous materials. The height and/or width of a reaction microchannel is preferably about 2 mm or less, and more preferably 1 mm or less. The length of a reaction channel is typically longer. Preferably, the length of a reaction channel is greater than 1 cm, in some embodiments greater than 50 cm, in some embodiments greater than 20 cm, and in some embodiments in the range of 1 to 100 cm. The sides of a microchannel are defined by reaction channel walls. These walls are preferably made of a hard material such as a ceramic, an iron based alloy such as steel, or a Ni-, Co- or Fe-based superalloy such as monel. The choice of material for the walls of the reaction channel may depend on the reaction for which the reactor is intended. In some embodiments, the reaction chamber walls are comprised of a stainless steel or Inconel® which is durable and has good thermal conductivity. The alloys should be low in sulfer, and in some embodiments are subjected to a desulfurization treatment prior to formation of an aluminide. Typically, reaction channel walls are formed of the material that provides the primary structural support for the microchannel apparatus. The microchannel apparatus can be made by known methods (except for the coatings and treatments described herein), and in some preferred embodiments are made by laminating interleaved plates (also known as "shims"), and preferably where shims designed for reaction channels are interleaved with shims designed for heat exchange. Of course, as is conventionally known, 'reactors' or 'separators' do not include jet engine parts. In preferred embodiments, microchannel apparatus does not include jet engine parts. Some microchannel apparatus includes at least 10 layers laminated in a device, where each of these layers contain at least 10 channels; the device may contain other layers with less channels.

Figure 1:
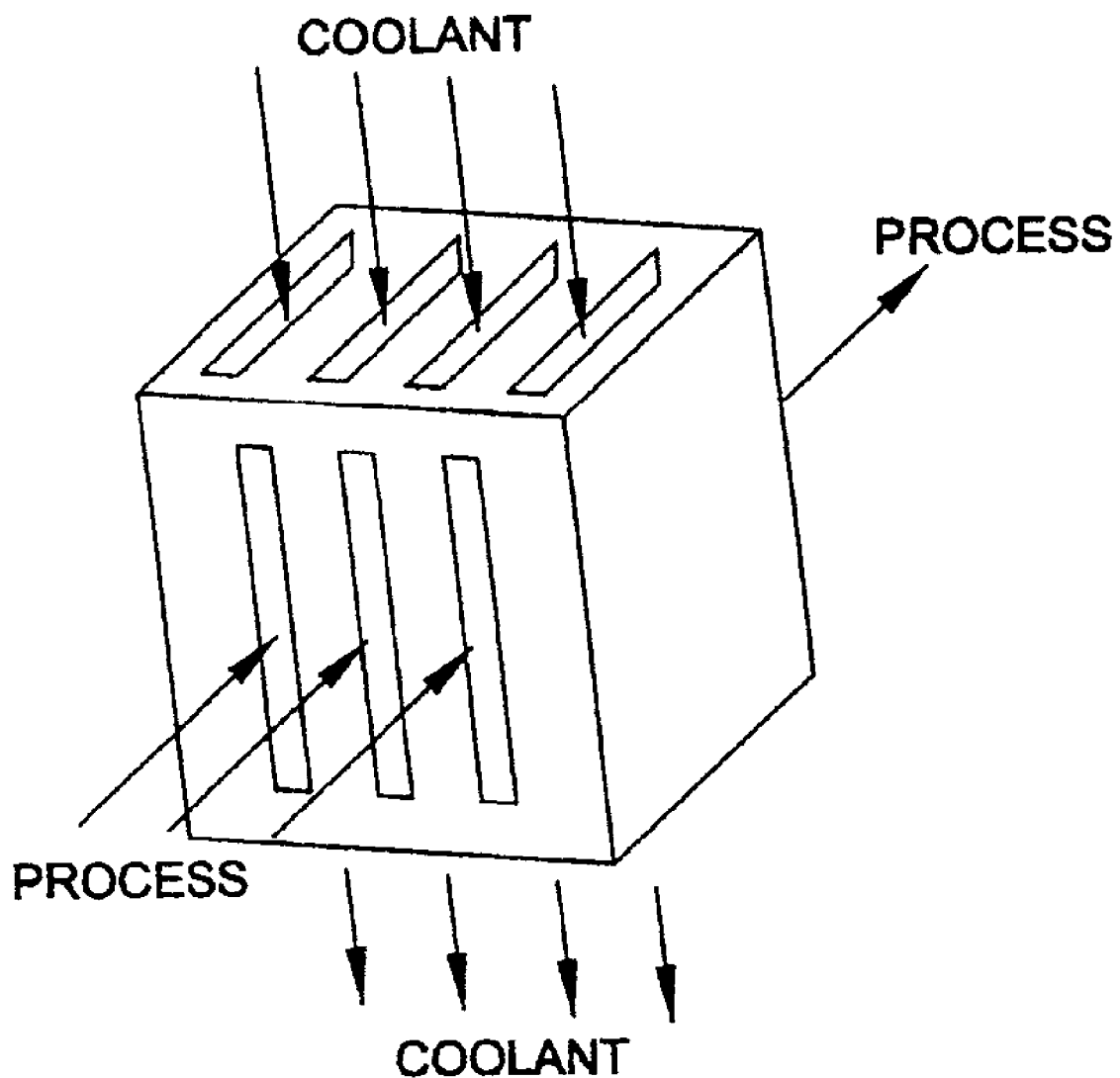
FIG. 1 is a simplified view of a microreactor with a set of reaction microchannels in a cross-flow relationship with a set of cooling microchannels.

FIG. 1 is a schematic and simplified view of one embodiment of a microchannel reactor in which reactant feed passes through a reaction microchannel (bottom) while coolant (in a cross-flow arrangement) flows through an adjacent heat exchanger (top). Microchannel reactors preferably include a plurality of microchannel reaction channels and a plurality of adjacent heat exchange microchannels. The plurality of microchannel reaction channels may contain, for example, 2, 10, 100, 1000 or more channels. In preferred embodiments, the microchannels are arranged in parallel arrays of planar microchannels, for example, at least 3 arrays of planar microchannels. In some preferred embodiments, multiple microchannel inlets are connected to a common header and/or multiple microchannel outlets are connected to a common footer. During operation, the heat exchange microchannels (if present) contain flowing heating and/or cooling fluids. Non-limiting examples of this type of known reactor usable in the present invention include those of the microcomponent sheet architecture variety (for example, a laminate with microchannels) exemplified in U.S. Pat. Nos. 6,200,536 and 6,219,973 (both of which are hereby incorporated by reference). Performance advantages in the use of this type of reactor architecture for the purposes of the present invention include their relatively large heat and mass transfer rates, and the substantial absence of any explosive limits. Microchannel reactors can combine the benefits of good heat and mass transfer, excellent control of temperature, residence time and minimization of by-products. Pressure drops can be low, allowing high throughput and the catalyst can be fixed in a very accessible form within the channels eliminating the need for separation. Furthermore, use of microchannel reactors can achieve better temperature control, and maintain a relatively more isothermal profile, compared to conventional systems. In some embodiments, the reaction microchannel (or microchannels) contains a bulk flow path. The term "bulk flow path" refers to an open path (contiguous bulk flow region) within the reaction chamber. A contiguous bulk flow region allows rapid fluid flow through the reaction chamber without large pressure drops. In some preferred embodiments there is laminar flow in the bulk flow region. Bulk flow regions within each reaction channel preferably have a cross-sectional area of $5 \times 10^{-8}$ to $1 \times 10^{-2}$ $m^2$, more preferably $5 \times 10^{-7}$ to $1 \times 10^{-4}$ $m^2$. The bulk flow regions preferably comprise at least 5%, more preferably at least 50% and in some embodiments, 30-99% of either 1) the interior volume of the reaction chamber, or 2) a cross-section of the reaction channel.

In many preferred embodiments, the microchannel apparatus contains multiple microchannels, preferably groups of at least 5, more preferably at least 10, parallel channels that are connected in a common manifold that is integral to the device (not a subsequnetly-attached tube) where the common manifold includes a feature or features that tend to equalize flow through the channels connected to the manifold. Examples of such manifolds are described in U.S. patent application Ser. No. 10/695,400, filed Oct. 27, 2003 which is incorporated herein as if reproduced in full below. In this context, "parallel" does not necessarily mean straight, rather that the channels conform to each other. In some preferred embodiments, a microchannel device includes at least three groups of parallel microchannels wherein the channel within each group is connected to a common manifold (for example, 4 groups of microchannels and 4 manifolds) and preferably where each common manifold includes a feature or features that tend to equalize flow through the channels connected to the manifold. An aluminide coating can be formed in a group of connected microchannels by passing an aluminum-containing gas into a manifold, typically, the manifold will also be coated.

Heat exchange fluids may flow through heat transfer microchannels adjacent to process channels (preferably reaction microchannels), and can be gases or liquids and may include steam, oil, or any other known heat exchange fluids—the system can be optimized to have a phase change in the heat exchanger. In some preferred embodiments, multiple heat exchange layers are interleaved with multiple reaction microchannels. For example, at least 10 heat exchangers interleaved with at least 10 reaction microchannels and preferably there are 10 layers of heat exchange microchannel arrays interfaced with at least 10 layers of reaction microchannels. Each of these layers may contain simple, straight channels or channels within a layer may have more complex geometries.

While simple microchannels can be utilized, the invention has particular advantages for apparatus with complex microchannel geometries. In some preferred embodiments, the microchannel apparatus includes one or more of the following characteristics: at least one contiguous microchannel has a turn of at least 45°, in some embodiments at least 90°, in some embodiments a u-bend, a length of 50 cm or more, or a length of 20 cm or more along with a dimension of 2 mm or less, and in some embodiments a length of 50-500 cm; at least 2 adjacent channels, having an adjacent length of at least one cm, are connected by plural orifices along a common microchannel wall where the area of orifices amounts to 20% or less of the area of the microchannel wall in which the orifices are located and where each orifice is 2 $mm^2$ or smaller, in some embodiments 1 $mm^2$ or smaller, in some embodiments 0.6 or 0.1 $mm^2$ or smaller—this is a particularly challenging configuration because a coating should be applied without clogging the holes; or at least two, in some embodiments at least 5, parallel microchannels having a length of at least 1 cm, have openings to an integral manifold, where the manifold includes at least one dimension that is no more than three times the minimum dimension of the parallel microchannels (for example, if one of the parallel microchannels had a height of 1 mm (as the smallest dimension in the set of parallel microchannels), then the manifold would possess a height of no more than 3 mm). An integral manifold is part of the assembled device and is not a connecting tube. In some apparatus, a microchannel contains a u-bend which means that, during operation, flow (or at least a portion of the flow) passes in opposite directions within a device and within a contiguous channel (note that a contiguous channel with a u-bend includes split flows such as a w-bend, although in some preferred embodiments all flow within a microchannel passes through the u-bend and in the opposite direction in a single microchannel).

A contiguous microchannel may have a different cross sectional area openings along the length of the contiguous microchannel. The different cross sectional areas may be formed by the stacking of different shims or laminae.

In some embodiments, the inventive apparatus (or method) includes a catalyst material. The catalyst may define at least a portion of at least one wall of a bulk flow path. In some preferred embodiments, the surface of the catalyst defines at least one wall of a bulk flow path through which the mixture passes. During operation, a reactant composition flows through the microchannel, past and in contact with the catalyst. In some preferred embodiments, a catalyst is provided as an insert that can be inserted into (or removed from) each channel in a single piece; of course the insert would need to be sized to fit within the microchannel. In some embodiments, the height and width of a microchannel defines a cross-sectional area, and this cross-sectional area comprises a porous catalyst material and an open area, where the porous catalyst material occupies 5% to 99% of the cross-sectional area and where the open area occupies 5% to 99% of the cross-sectional area. In some embodiments, the open area in the cross-sectional area occupies a contiguous area of $5 \times 10^{-8}$ to $1 \times 10^{-2}$ m$^2$. In some embodiments, a porous catalyst (not including void spaces within the catalyst) occupies at least 60%, in some embodiments at least 90%, of a cross-sectional area of a microchannel. Alternatively, catalyst can substantially fill the cross-sectional area of a microchannel (a flow through configuration). In another alternative, catalyst can be provided as a coating (such as a washcoat) of material within a microchannel reaction channel or channels. The use of a flow-by catalyst configuration can create an advantageous capacity/pressure drop relationship. In a flow-by catalyst configuration, fluid preferably flows in a gap adjacent to a porous insert or past a wall coating of catalyst that contacts the microchannel wall (preferably the microchannel wall that contacts the catalyst is in direct thermal contact with a heat exchanger (preferably a microchannel heat exchanger), and in some embodiments a coolant stream contacts the opposite side of the wall that contacts the catalyst).

Metal Aluminide Layer

In some embodiments of the invention, at least a portion of at least one interior wall of a microchannel apparatus (preferably a microreactor) is coated with a layer of a metal aluminide (preferably nickel aluminide (NiAl)). It has been surprisingly discovered that an alumina wall coating formed by oxidizing a metal aluminide (NiAl in the examples) coating provides superior corrosion resistance as compared to either thermally grown oxide layer (grown from the substrate without forming an aluminide) or a solution deposited alumina layer. It is believed that exceptionally uniform and dense coatings result from solid state reaction of aluminum deposited at the surface from the gas phase and nickel diffusing out from the substrate towards the surface. In addition, nickel may be plated onto a metal that is not rich in nickel, such as stainless steel, to create a reactive surface for the aluminidization process. Nickel aluminide could also be deposited by supplying both Al and Ni precursors in the vapor phase concurrently or as a mixture. In a related aspect, a catalyst or catalyst intermediate is formed on substrates having such a nickel aluminide surface. Of course, the invention also includes methods of making catalysts or microchannel apparatus comprising coating a substrate (preferably a Ni-based alloy) with chemically vapor deposited aluminum that is simultaneously and/or subsequently converted to an aluminide (such as NiAl).

A NiAl layer can be formed by exposing a Ni-based alloy to AlCl$_3$ and H$_2$ at high temperature, preferably at least 700° C., in some embodiments 900 to 1200° C. Aluminum is deposited at the surface as a result of the reaction between AlCl$_3$ and H$_2$. At temperature, Ni from the substrate would diffuse towards the surface and react with the aluminum to form a surface layer of nickel aluminide. The Ni source could be Ni in a Ni-based alloy substrate, an electrolytically plated Ni layer or a vapor deposited Ni layer that can be deposited over a substrate prior to aluminidization. It is believed that other metal aluminides (such as Co or Fe) could be formed under similar conditions.

Preferably, the aluminidization process is conducted with good control of flow to the device through a manifold. For example, good control can be obtained by passing flow into microchannels through a leak-free manifold. Preferably the aluminidization process is carried out at 100 Torr (2 pounds per square inch absolute, psia) to 35 psia (1800 Torr), more preferably between 400 Torr (8 psia) and 25 psia (1300 Torr).

In preferred embodiments, nickel aluminide contains 13 to 32% aluminum, more preferably 20 to 32%; and still more preferably consists essentially of beta-NiAl. If Al falls significantly below the 13% weight % level of the gamma-prime phase, it may be expected to negatively affect the quality of the thermally-grown alumina scale.

In some embodiments, the metal aluminide layer has a thickness of 1 to 100 micrometers; in some embodiments a thickness of 5 to 50 micrometers. In some embodiments, the aluminide layer is completely oxidized; however, this is generally not preferred.

The metal surface upon which the metal aluminide is formed is preferably substantially free of oxides. Optionally the surface can be cleaned, polished, or otherwise treated to remove such oxides if any are present.

A reactor can be formed by a catalyst that is disposed as a coating on an interior wall (where the walls can be simple walls or shaped walls). Alternatively, or in addition, inserts such as fins, plates, wires, meshes, or foams can be inserted within a channel. These inserts can provide additional surface area and effect flow characteristics. An aluminidization process can be used to fix inserts onto a wall of a device (such as a reactor); the resulting aluminide layer fills some voids and greatly improves thermal conduction between the insert and device wall (such as reactor wall).

Thermally Grown Oxide

Metal aluminide or more preferably NiAl layer, is heated in the presence of oxygen or other oxidant to grow a layer of aluminum oxide. It was surprisingly discovered that when the surface was first heated to the treatment temperature in the absence of O$_2$ or other oxidant, prior to growth of the oxide layer, a significantly improved oxide coating resulted. The oxide layer grown during heating the surface to the treatment temperature in the presence of oxygen exhibited spalling while the layer grown by heating the surface from ambient temperature to the treatment temperature in the absence of oxygen did not. Oxygen can be substantially excluded from the heat up step of the heat treatment process.

A convenient and preferred method of excluding oxygen from the surface while heating the surface from ambient temperature to treatment temperature involves exposure to hydrogen. The hydrogen effectively reduces the oxidizing power of the atmosphere during heat up to prevent premature growth of the oxide scale. Other gases that reduce the oxidizing power of the gas, such as NH3, CO, CH4, hydrocarbons, or the like, or some combination of these could also be used. All of these reducing gases could be used in combination with inert gases such as N2, He, Ar, or other inert gases, or combinations of inert gases.

The oxide layer is then preferentially formed by exposing the surface to an oxidizing atmosphere at or within 100° C. of the heat treatment temperature. The oxidizing gas could be air, diluted air, oxygen, $CO_2$, steam or any mixture of these gases or other gases that have substantial oxidizing power, with or without an inert diluent. The inert diluent could be inert gases such as $N_2$, He, Ar, or other inert gases, or combinations of inert gases. The temperature of oxide growth is at least 500° C., preferably at least 650° C. The surface can be exposed to the treatment condition in stages of different temperatures, different oxidizing powers, or both. For example, the surface could be treated at 650° C. for a time and then heated to 1000° C. and kept at 1000° C. for an additional time. Such controlled and staged surface treatment can generate a surface structure of a desired morphology, crystalline phase and composition.

Superior oxide coatings result from preheating to about 1000° C. (in some embodiments at least 900° C.) under an inert, or preferably, a reducing atmosphere such as a $H_2$-containing atmosphere (preferably at least 1000 ppm $H_2$, in some embodiments 1 to 10% $H_2$). Preheat under a reducing atmosphere was observed to produce superior oxide coatings with little or no spalling. It is believed that this control of preheat conditions results in superior coatings because it minimizes the formation of nickel oxide. Great care must be taken selecting a truly "inert" atmosphere because atmospheres conventionally considered as inert atmospheres yield inferior results. That is because nickel oxide can theoretically form even at $10^{-10}$ atm oxygen and chromia at $10^{-21}$ atm oxygen; such extreme levels of purity are not available in commercially available gases. Therefore, reducing atmospheres are preferred.

Conventional wisdom suggests that the higher the temperature, the faster the oxidation rate. Surprisingly, we discovered that the oxide grew faster at 1000° C. than at 1050° C. One possible explanation is that the high temperature oxide could be denser, thus discouraging faster growth. The lower temperature oxide could be more porous thus allowing faster oxide growth. On the other hand, too high a temperature will promote interdiffusion between the aluminide layer and the substrate, and the aluminide will disappear into the bulk of the alloy. Therefore, the thermally-grown oxide is preferably conducted in the temperature range of 1000 to 1100° C., more preferably 1025-1075° C. In the presence of excess oxygen, for example flowing air, the oxidation treatment is preferably conducted for 30 to 6000 min, more preferably 60 to 1500 min.

It should be recognized that the term "alumina" can be used to refer to a material containing aluminum oxides in the presence of additional metals. In the descriptions herein, unless specified, the term "alumina" encompasses substantially pure material ("consists essentially of alumina") and/or aluminum oxides containing modifiers.

Thinner layers are less prone to cracking; therefore, the thermally-grown oxide layer is preferably 5 µm thick or less, more preferably 1 µm thick or less, and in some embodiments 0.1 µm to 0.5 µm thick. In some preferred embodiments, the articles have an oxide thickness of a thermally grown scale of less than 10 micrometers, and in some embodiments an oxide thickness of a thermally grown scale in the range of about 1 to about 5 micrometers. In some embodiments, thicker oxide layers mat be useful, such as for a higher surface area catalyst support. In some preferred embodiments, the articles have an oxide thickness of a washcoat of less than 10 micrometers, and in some embodiments an oxide thickness of a washcoat in the range of about 1 to about 5 micrometers. Typically, these thicknesses are measured with an optical or electron microscope. Generally, the thermally-grown oxide layer can be visually identified; the underlying aluminide layer is metallic in nature and contains no more than 5 wt % oxygen atoms; surface washcoat layers may be distinguished from the thermally-grown oxide by differences in density, porosity or crystal phase.

The aluminidized surface can be modified by the addition of alkaline earth elements (Be, Mg, Ca, Sr, Ba), rare earth elements (Y, La, Ce, Pr, Nd, Pm, Sm, Eu, Gd, Th, Dy, Ho, Er, Tm, Yb, Lu) or combinations of these. The addition of these elements is followed by a reaction in an oxidizing atmosphere to form a mixed oxide scale. When the modifying element is La, for example, the scale contains LaAlOx, lanthanum aluminate. In some embodiments, a stabilized alumina surface can be formed by adding a rare earth element such as La, coated with a layer of alumina sol, then doped with an alkaline earth element such as Ca followed by a heat treatment.

La was demonstrated to be effective in improving the adhesion between the sol-alumina coating and the alumina scale. Inconel™ 617 substrate after aluminidization and heat treatment was coated with an aqueous solution of La nitrate, followed by drying and air calcination at 1,000° C. for 4 hr. It was then coated with sol-alumina and exposed to the corrosion testing environment at 960° C. for 1,000 hr. The sol-alumina coating survived well, with no visible signs of damage such as flaking or cracking. In contrast, similar testing with an Inconel™ 617 substrate after aluminidization and heat treatment and coated with sol-alumina without pretreatment with an aqueous solution of La nitrate, showed that most of the sol-alumina coating was lost after only 100 hr of testing, suggesting insufficient adhesion between the sol-alumina and the alpha-alumina scale on the aluminide.

The benefit of La as an adhesion promoter is believed to be associated with its reaction with the alpha alumina scale to change the surface to a more chemically active La aluminate. Surface X-ray diffraction (XRD) showed the formation of $LaAlO_3$. Without La addition, only alpha alumina and some background nickel aluminide could be detected by surface XRD.

Flow Rates

The aluminide layer is preferably formed by reacting a surface with a gaseous reactant mixture under dynamic flow conditions. The aluminum needed for aluminide formation can be deposited in a microchannel by flowing $AlCl_3$ and $H_2$ into a microchannel. In a multichannel device, the Al can be deposited only on selected channels (such as by plugging certain channels to exclude the aluminum precursors during a CVD treatment). The aluminum layer can also be applied onto selected portions of a microchannel device by controlling relative pressures. For example, in a microchannel device that contains at least two channels separated by a wall and in which the two channels are connected to each other via orifices in the wall, $AlCl_3$ flows through a first channel while $H_2$, at a higher pressure, flows through a second channel and through the orifices into the first channel.

Static gas treatments can be conducted by filling the desired areas with the reactive gases with interim gas pumping if needed.

Figure 2:
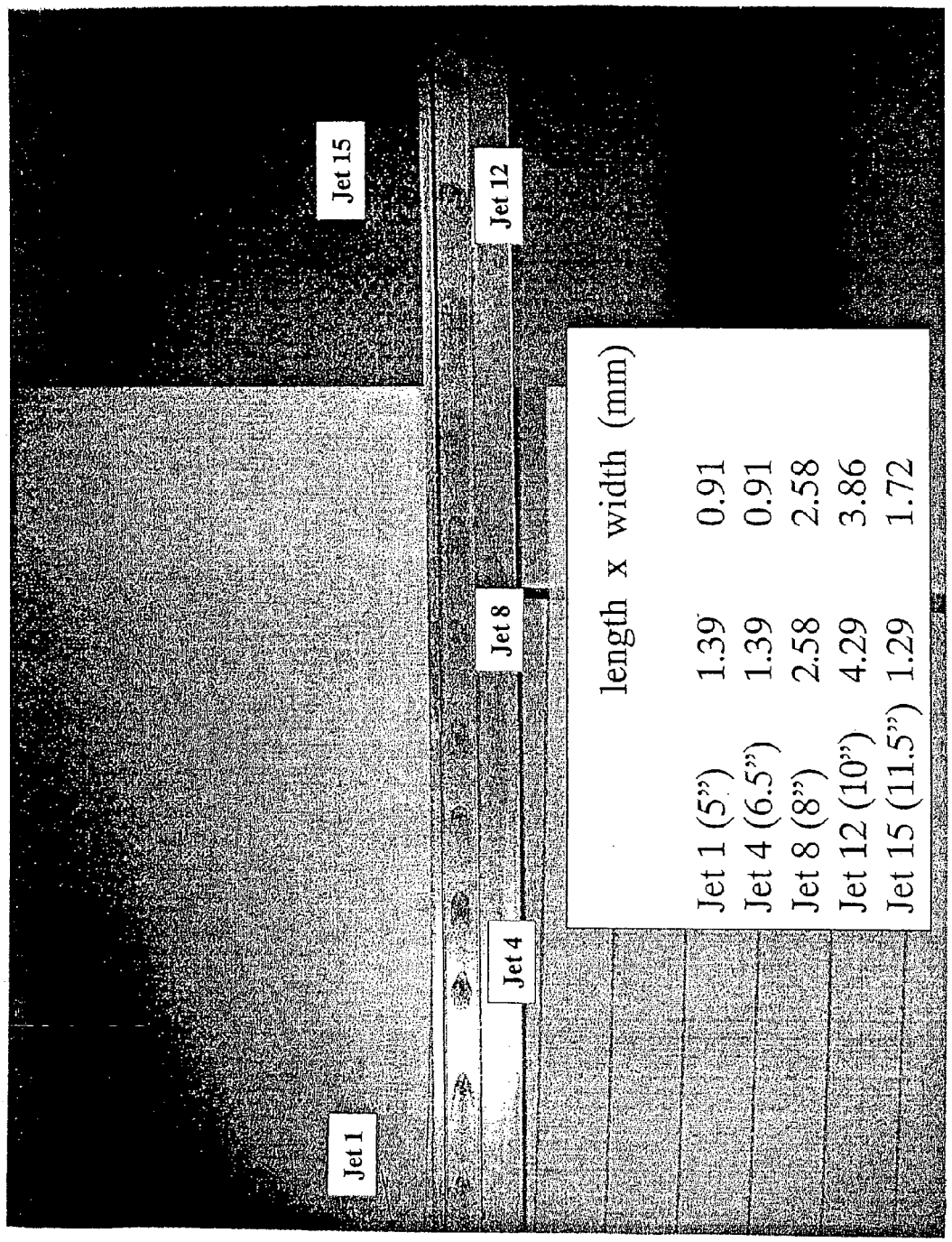
FIG. 2 is a photograph of a cut-open, microchannel device showing an aluminidized channel surface. This surface was on the side of a microchannel that was opposite a side having orifices (jets) and aluminidizing gas flowed through these orifices and impacted the surface, causing jet impingment defects.

It has been found that excessively high flow rates can lead to uneven coatings. An example of this problem can be seen in FIG. 2.

Two flow metrics have been established for characterizing the extent of shear and jet impaction. For mechanical shear, the total wall shear stress (two tangential components and one normal component) has been selected as the relevant metric. Likewise dynamic pressure, which is equal to the momentum flux of the jet plume, has been chosen as a means of monitoring the effects jet impaction on coating formation.

Computational fluid dynamic (CFD) simulations of several device aluminidization tests were conducted to contrast the predicted values for wall shear stress and dynamic pressure in regions where the treatment was not successful to those regions where treatment was successfully applied. These simulations used as boundary conditions the same temperature, flow rates, stream composition, and flow input/out put configuration as was used in the respective device aluminidization process. Comparisons utilized autopsy results of aluminized and heat treated devices. It was determined from these studies that there could be established a threshold value for both wall shear stress and dynamic pressure whereby for flow conditions in which both shear and dynamic pressure were below the threshold values, good treatment should take place; and when the threshold value of either variable was exceeded, the treatment could be flawed.

Metric Thresholds

Wall shear stress is expressed as $\tau = \mu |\vec{\nabla} u|$ or the product of the fluid viscosity $\mu$ and the magnitude of the local velocity gradient, expressed in units of force per channel wall unit surface area. This quantity reflects the magnitude of the molecular frictional forces at the interface between a very thin fluid layer and the channel wall itself.

The dynamic pressure (or equivalently the momentum flux) is given by the expression $$p = \frac{1}{2}\rho u^2$$

where $\rho$ denotes the fluid density and u the local fluid velocity magnitude. It is a measure of the force imparted by the change in momentum when a jet plume strikes the side of a channel and is also expressed in terms of force per unit area. CFD simulations of a number of combustion test devices were performed to determine if there was any definitive correlation between poor aluminide coating and critical values in either wall shear stress or dynamic pressure.

Based on a detailed analysis of the tested devices, the following thresholds were established:

Wall Shear Stress: To ensure drag forces do not impair the formation of aluminide coating, the wall shear stress should not exceed 50 Pa if the aluminidization gases are flowing through a jet orifice. Allowable wall shear stress should not exceed 200 Pa if the aluminidization gases are not impinging on the wall of a microchannel as through a jet orifice.

Wall Dynamic Pressure: To ensure momentum impact erosion does not impair the adequate formation of aluminide coating, the wall dynamic pressure should not exceed 10 Pa if the aluminidization gases are flowing through a jet orifice. Substantially higher wall dynamic pressure is allowed in the absence of a jet orifice. Allowable wall dynamic pressure should not exceed 100 Pa if the aluminidization gases are not impinging on the wall of a microchannel as through a jet orifice.

Practical Application

The metrics presented above are used to determine the flow configuration and individual inlet flow rates that will imply good aluminidization treatment from a fluidics standpoint. Generally there are a combination of possible input and output flow paths for a device. CFD predictions are used to determine those inflow/outflow combinations and the individual inlet flow rates that will result in globally maintaining the wall shear stress below 50 Pa, and the wall dynamic pressure below 10 Pa throughout the entire device if flow of at least one of the aluminidization gases is through a jet orifice. The maximum allowable inlet flow rate that satisfies these two criteria and the associated flow configuration becomes the recommended procedure for aluminidizing the device based on the metrics developed here. Examples of the aluminide coating resulting from this guidance produced aluminide coatings without visual defects.

A surprising discovery of this invention is that flowing (nonstatic, see previous discussion on preferred pressures) aluminidizing gas at rates below the threshold rates discussed above produced defect-free, highly uniform (less than 10% variation in thickness) aluminide coatings.

Figure 3:
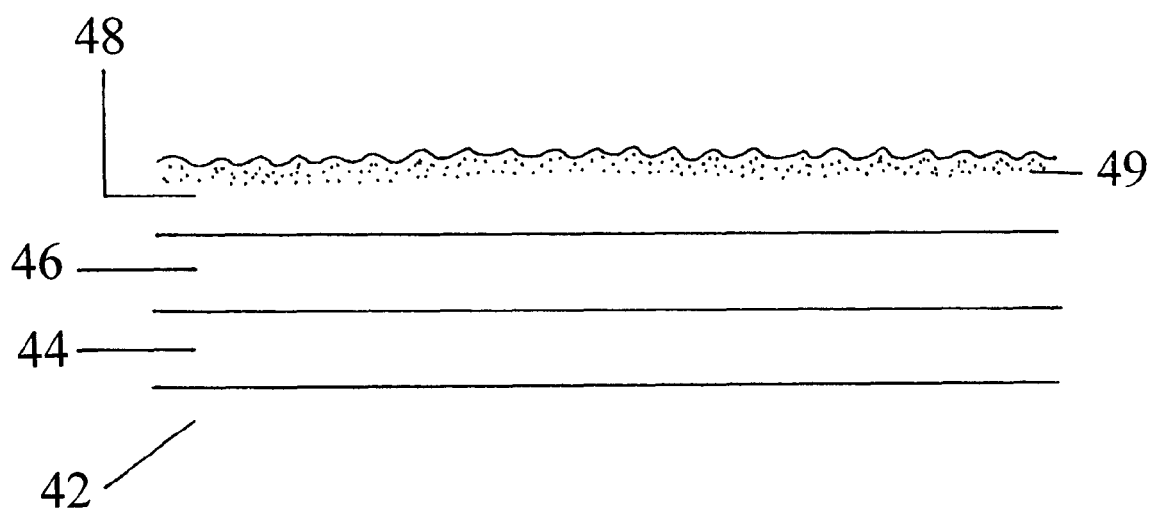
FIG. 3 is a schematic cross-sectional illustration of an aluminide coated substrate.

FIG. 3 schematically illustrates an application in which a metal substrate 42 has a first layer of aluminide 44, a layer of alumina with sintering aid(s) 46, and a layer of alumina 48. In preferred embodiments, the outermost layer further comprises an additional catalytically active material 49.

II. Washcoats

Washcoats are coatings that are applied to a channel wall by exposing a channel wall to a liquid based coating composition. The coating composition may contain a suspension of particles (typically a metal oxide or mixture of metal oxide and metal particles) or a sol.

Washcoat Uniformity Using a Fill and Drain Method without Capillary Features

Process Description

A fill and drain method of applying washcoat solution to the substantially planar and flat walls of a microchannel include slowly filling a liquid solution to a parallel array of microchannels at a point that exposes the desired coating location to the washcoat solution. After the channels are filled, either completely or to an intermediate level, the solution is allowed to drain from one end of the device. Fluid is left behind on the microchannel walls. A second fluid, such as a nitrogen gas, may then be used to purge the microchannels and remove excess material.

A fill and drain method has been applied to washcoating an aqueous coating composition onto aluminidized Inconel™ walls of a microchannel reactor and has not demonstrated sufficient uniformity.

Modeling Approach

Notation

Fluidic Properties $\mu$ viscosity (molecular)

$\rho$ density $\sigma$ surface tension (relative to ambient gas)

$\nu$ viscosity (dynamic) $\nu = \mu/\rho$ $\vec{v}, \vec{u}$ velocity vector $v_z$ velocity magnitude in the axial dimension $\theta$ wall adhesion contact angle Channel Geometry H channel gap W channel width L channel length $D_H$ channel hydraulic diameter Other z axial coordinate (z=0 ⇒ initial fill line)

$\beta$ angle of incline ($\beta$=0 ⇒ vertical orientation)

$\theta$ gravitational constant

Drain Rate

Drain rate is based on a differential equation describing the change in total gravitational, viscous loss (shear flow), and capillary forces as a function of change in fluid level as it drains from the channel. The force balance involving all three components (gravitational, viscous loss, and capillary) is exactly solvable but numerically difficult to compute in practice. What follows below is an approximate solution to this problem with capillary force neglected, again with details of the derivation located in the appendix.

When the fluid level has dropped the equivalent to several hydraulic diameters below in the initial liquid fill line, the average velocity magnitude of the draining fluid is given by the following expression:

$$u_{drain} \sim u_o = \frac{\rho g D_H^2}{16\mu}\cos\beta$$

Initial Film Thickness

The initial average film thickness is based on a model by Landau and Levich (1942) and Deryagin (1943, 1945) where they studied the residual liquid layer remaining on a flat surface drawn at constant rate from a quiescent bath. The model is stated mathematically as follows:

$$\delta_o = \left(\frac{\mu u_o}{\rho g}\right)^{1/2} f(\xi)$$

where $\xi = \mu u_o/\sigma$ and $f$ represents a function of this dimensionless variable $\xi$, namely $$f(\xi) = \begin{cases} 0.93\xi^{1/6} & \text{for } \xi \ll 1 \\ 1 & \text{for } \xi \gg 1 \end{cases}$$

This model is reported to have been experimentally validated by Deryagin and Titiyevskaya (1945). Although it appears to provide reasonable results, one drawback to this expression is that there is no explicit dependence on length of the plate. Intuitively one expects length to play a role since it determines the overall force of gravity and surface shear stress on the liquid layer. An alternative expression for initial average film thickness is given by Levich (1962):

$$\delta_o = \left(\frac{\sigma}{\rho g}\right)\left(\frac{F_\tau}{\sigma}\right)^2$$

where $F_\tau$ represents the total wall shear stress integrated over the entire surface area of the liquid-solid interface. Unfortunately, sample calculations showed that this expression yields unrealistically small values for initial film thickness. Two expressions used for total wall shear were as follows:

Expression 1:

$$F_\tau = \frac{32\mu u_o L^2 W}{D_H^2} \text{ (Hagen-Poiseuille)}$$

Expression 2:

$$F_\tau = \frac{0.4696\mu u_o LW}{\sqrt{2\nu L/u_o}} \text{ (White, Viscous Fluid Flow, 233-235)}$$

Time and Spatially-Dependent Film Thickness

Figure 4:
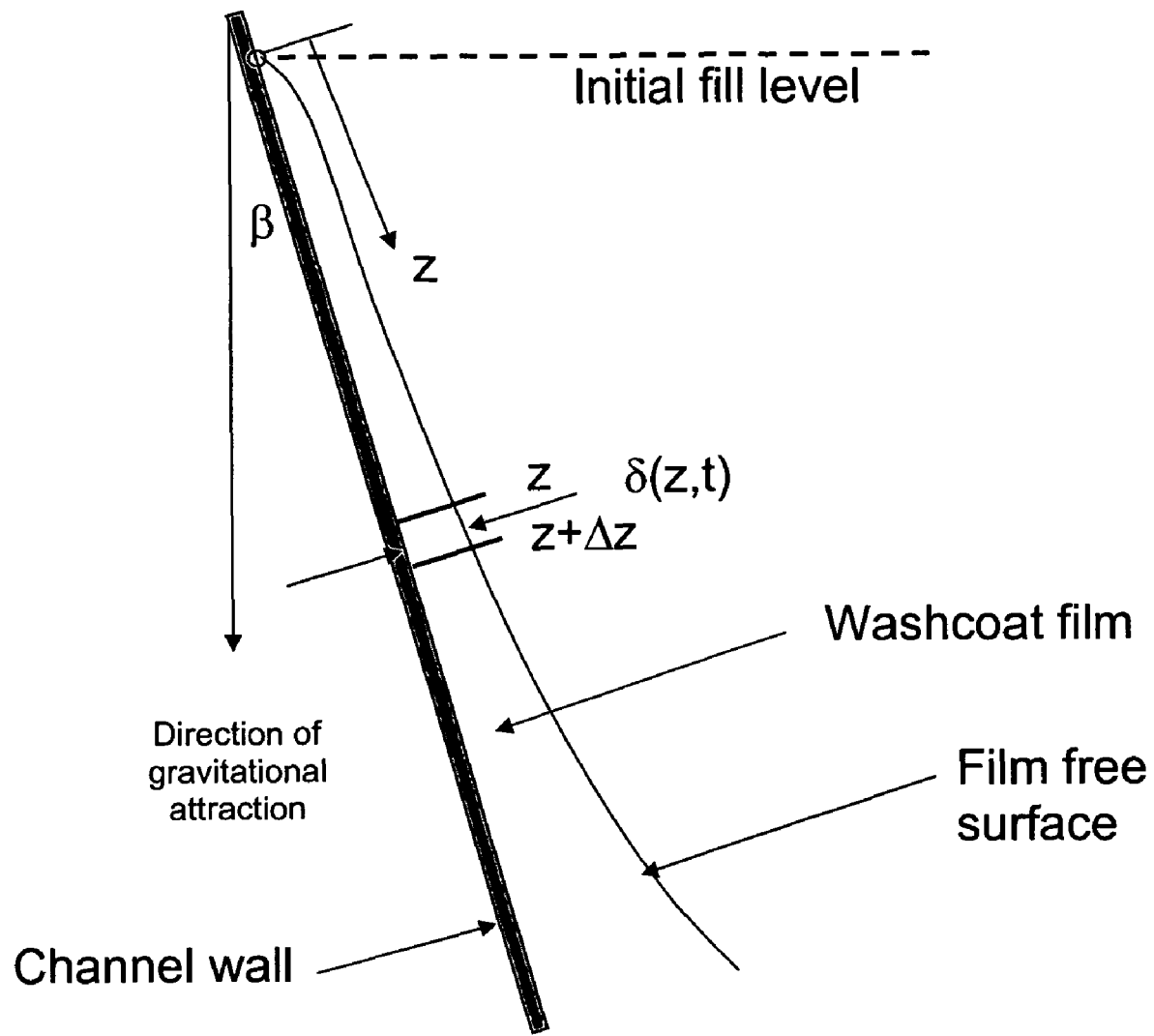
FIG. 4 is an illustrative sketch of washcoat model variables.

A sketch of the model essentials is given in FIG. 4. As indicated, the liquid film thickness, $\delta$, is a function of both axial location, z, and elapsed time since bulk drainage, t. We begin with the continuity equation $$\frac{\partial \rho}{\partial t} = -(\vec{\nabla} \cdot \rho\vec{v}) \quad (1)$$

and perform an unsteady mass balance on the film between z and z+$\Delta$z: In order to reduce the model to a pseudo 1D approach, we replace the local velocity vector $\vec{v}$ with the cross-sectionally averaged value over the local thickness of the liquid film. Neglecting the density of the surrounding gaseous medium, the local density in the differential volume, $\rho$, now becomes solely a function of local film thickness and the continuity equation becomes $$-\frac{1}{\delta}\frac{\partial \delta}{\partial t} = \frac{\partial <v_z>}{\partial z} \quad (2)$$

where $<v_z>$ is the cross-sectionally averaged velocity at axial location z.

The following expression gives the velocity distribution for a liquid film as a function of normal distance x from the free (outer) film surface toward the wall surface and inclination angle $\beta$ relative to the direction of the force of gravity (*Transport Phenomena*, Bird, Stewart, and Lightfoot, $2^{nd}$ Ed., Wiley and Sons):

Without Capillary Forces:

$$v_z = \frac{\rho g \delta^2 \cos\beta}{2\mu}\left[1 - \left(\frac{x}{\delta}\right)^2\right] \quad (3)$$

With Capillary Forces within the Channel Included (Note not Surface Capillary Features):

$$v_z = \delta^2\left[\frac{1}{2}\left(\frac{\rho g}{\mu}\right)\cos\beta - \frac{2}{LD_H}\left(\frac{\sigma}{\mu}\right)\cos\theta\right]\left[1 - \left(\frac{x}{\delta}\right)^2\right] \quad (3)$$

where $\mu$=liquid viscosity $\sigma$=liquid surface tension $\theta$=wall adhesion contact angle $D_H$=channel hydraulic diameter L=channel total length $\theta$=local acceleration of gravity.

Calculating the Cross-Sectional Average $<v_z>$:

$$<v_z> = \frac{1}{\delta}\int_0^\delta v_z dx = \begin{cases} \frac{1}{3}\left(\frac{\rho g}{\mu}\right)\delta^2 \cos\beta \text{ without capillary forces} \\ \frac{1}{3}\delta^2\left[\left(\frac{\rho g}{\mu}\right)\cos\beta - \frac{4}{LD_H}\left(\frac{\sigma}{\mu}\right)\cos\theta\right] \text{ with capillary forces} \end{cases} \quad (4)$$

Substitution of the expression for $<v_z>$ in Eqn (4) into Eqn (2) yields the following partial differential equation for $\delta(z,t)$:

Without Capillary Forces:

$$\frac{\partial \delta}{\partial t} + \frac{2}{3}\left(\frac{\rho g}{\mu}\right)\delta^2 \cos\beta \frac{\partial \delta}{\partial z} = 0 \quad (5a)$$

With Capillary Forces:

$$\frac{\partial \delta}{\partial t} + \frac{2}{3}\delta^2\left[\left(\frac{\rho g}{\mu}\right)\cos\beta - \frac{4}{LD_H}\left(\frac{\sigma}{\mu}\right)\cos\theta\right]\frac{\partial \delta}{\partial z} = 0 \quad (5b)$$

The solution to this equation yields the washcoat thickness as a function of axial location and elapsed time:

$$\delta(z,t) = \begin{cases} \sqrt{\frac{3}{2}\left(\frac{\mu}{g\rho\cos\beta}\right)\left(\frac{z}{t+t_o}\right)} \text{ without capillary forces} \\ \sqrt{\frac{3}{2}\left(\frac{\mu}{g\rho\cos\beta - \frac{4}{LD_H}\sigma\cos\theta}\right)\left(\frac{z}{t+t_o}\right)} \text{ with capillary forces} \end{cases} \quad (6)$$

The variable $t_o$ is a normalization constant such that the average film thickness over the entire length of the channel, L, is equal to $\delta_o$, the initial film thickness, at time t=0. Specifically, we require $$\frac{1}{L}\int_0^L \delta(z, t=0)dz = \delta_o$$

which gives the following value for the normalization constant:

$$t_o = \frac{2}{3}\left(\frac{\mu}{\rho g \cos\beta}\right)\frac{L}{\delta_o^2}$$

Special Modeling Requirements or Assumptions
  Assumptions
    The model only considers 1-dimensional drainage of washcoat under gravitational, viscous loss, and capillary forces. If desired, an alternative value can be specified for the drainage rate $u_o$ to obtain the initial film thickness during, for example, pump assisted evacuation of the channel.
    The model is most applicable to single or parallel flat plates. Specifically, there are no wicking effects accounted for in the corners of a rectangular channel. In practice, substantially thicker (more than 2× the flat region) coatings are observed in the corners of the microchannel reactor when a fill and drain method of coating is used.
    No provisions have been made for liquid film blow-off during the purge cycle. However, it should be recognized that current washcoat protocol calls for drainage (either gravity or pump-assisted) prior to purge cycle. Therefore, up to the time that purge cycle commences, this model should be reasonably accurate for predicting liquid film thickness distribution.
    The model assumes the fluidic properties remain constant point values for all time. In particular, drying of the film is not accounted for in this model.
  Restrictions
    The following restrictions on use of this model should be followed:
    The expression in Eqn (6) should only be applied to estimate the attrition in the wet washcoat film layer during drainage after the majority of the fluid has been removed from the channel. There may be some subjectivity associated when to set t=0 in the model. From the standpoint of validation, t should be set equal to zero when the gas can pass through the entire length of the channel, i.e. at no place is the entire cross-sectional area occluded with liquid.
    The model is most applicable when the liquid film thickness is dominated by gravitational forces. Wall adhesion and capillary forces have been neglected during bulk drainage of the washcoat. If most of the initially wetted surface area remains wetted during the drainage cycle, the omission of capillary forces has a negligible effect on the accuracy of the model. However, if appreciable wicking takes place such that significant areas of once wetted channel form a wet/dry interface, then capillary forces will become more significant.
    The thickness estimate is only valid in the center of a channel wall face, i.e., away from corners and other more complex topology.
Model Results
  Drainage Rate
    For essentially all credible values for washcoat physical properties and channel dimensions, gravitational drainage flow rate is virtually steady state within a distance of several hydraulic diameters below the initial fill level. An analytic expression below is provided for the average flow velocity. This flow velocity (or alternatively another flow velocity if flow is pump assisted) is used in the initial film thickness calculation.
  Initial Film Thickness
    The model used at present for initial film thickness is a function solely of the average drain velocity and fluidic properties of the washcoat. It has no geometry dependence. An alternative expression for initial film coat thickness that could potentially use both the hydraulic diameter and length of the channel is discussed but not used at present because it appears to be giving unreasonable results.
  Time and Spatially-Dependent Film Thickness
    The model indicates that the wet washcoat thickness varies as $(z/t)^{1/2}$ where z is the axial location below the fill level in the channel and t represents the elapsed time following the bulk drainage of fluid out of the channel. Model input parameters include washcoat viscosity, density, and the local acceleration of gravity. The model is judged to be applicable only during the initial stages of washcoat application where gravitational effects dominate wall adhesion and vertical capillary forces.

Model Summary

An analytical solution to the partial differential equations describing a liquid falling film along the sides of a channel that has been filled and drained has been obtained. The model requires the following input parameters: (1) liquid viscosity, (2) liquid density, (3) angle of inclination relative to the direction of gravitational attraction, and (4) local acceleration of gravity. The variables in the solution are (1) the axial location measured from the fill mark in the direction of gravitational attraction and (2) the time elapsed since bulk drainage of the channel took place (i.e., the time since the interior liquid filling the channel had been removed and now only excess liquid clings to the sides of the wall). The model predicts the reduction in liquid thickness as a function of time for a given axial location as washcoat drains down the side of the channel when gravitational attractions dominates wall adhesion and capillary effects.

Conclusions and Recommendations

Parameter studies using the tool and inspecting the equation solutions suggest the following implications for the washcoat process if capillary features are not present on the walls of an otherwise smooth microchannel wall:

Fluidic Properties

Density: increased density increases the initial film thickness but also increases the rate of thinning Viscosity: Higher viscosity results in greater initial film thickness and a lower rate of thinning Surface tension: Increased surface tension decreases initial film thickness but has little impact on film thinning rate Contact angle: Second order effect on film thinning (3% to 10% change in film thickness)

Channel Dimensions

Hydraulic diameter: larger channel diameter results in a thicker initial film layer—but has negligible effect on thinning rate Length: longer channels result in more washcoat non-uniformity Force Contribution Gravitational and viscous loss forces dominate and balance one-another to give a nearly constant drain rate Capillary forces in the vertical direction are second order and play a role at the top of the liquid column between wetted and dry surfaces. They are also expected to play a role during draining, where fluid will be held up near the bottom of the microchannels.

Property Contributions

Viscosity plays largest role in determining initial and final layer thickness

Density is next largest contributor with increasing density resulting in thicker initial film later compensated by higher rate of film thinning Surface tension plays a significant role only during formation of the initial residual film layer but has negligible effect on film thickness after several minutes References Deryagin, B. V., 1943, *Dokl. Akad. Nauk* SSSR 39, 11.
Deryagin, B. V., 1945, *Acta Physicochimica* URSS 20, 6.
Deryagin, B. V. and A. S. Titiyevskaya, 1945, *Acta. Akad. Nauk* SSSR 50, 307.
Landau, L. D. and V. G. Levich, 1942, *Acta Physicochimica* URSS 17, 42.
Levich, V. G., 1962, *Physiochemical Hydrodynamics*, Prentice-Hall.
Rossum, J. J, "Viscous lifting and drainage of liquid," *Journal of Scientific Research* 7, 121-144.

Models predict that the intrachannel uniformity of coating is poor (>20% variability) for all fluid properties. Where the coating at the top of the coated section is quite thin and a much thicker coating is present at the bottom of the microchannel. These results have been verified experimentally, where the measured catalsyt composition at the bottom edge of the catalyst channel is more than 20% thicker (or higher weight loading) than the catalyst at the top of the microchannel. In some cases, no catalyst was observed at the top of the microchannel.

It should also be noted, that it is possible to reduce the intrachannel non-uniformity by coating to a vertical height much higher than the desired level such that the desired coating or reactor region length falls within the near-asymptotic region of the axial coating profile. This would work reasonably well if the drying time were long enough such that the coating would not set up (dry in place) a poor coating profile. It would be possible to wash away the uneven catalyst that was retained above the desired coating location. This would be possible if a second fluid were filled and drained from the opposite end of the microchannel reactor or device. The second fluid would solubilize the uneven coating and remove the material. Several fill and drain steps may be requried to wash out the undesired catalyst.

Figure 5:
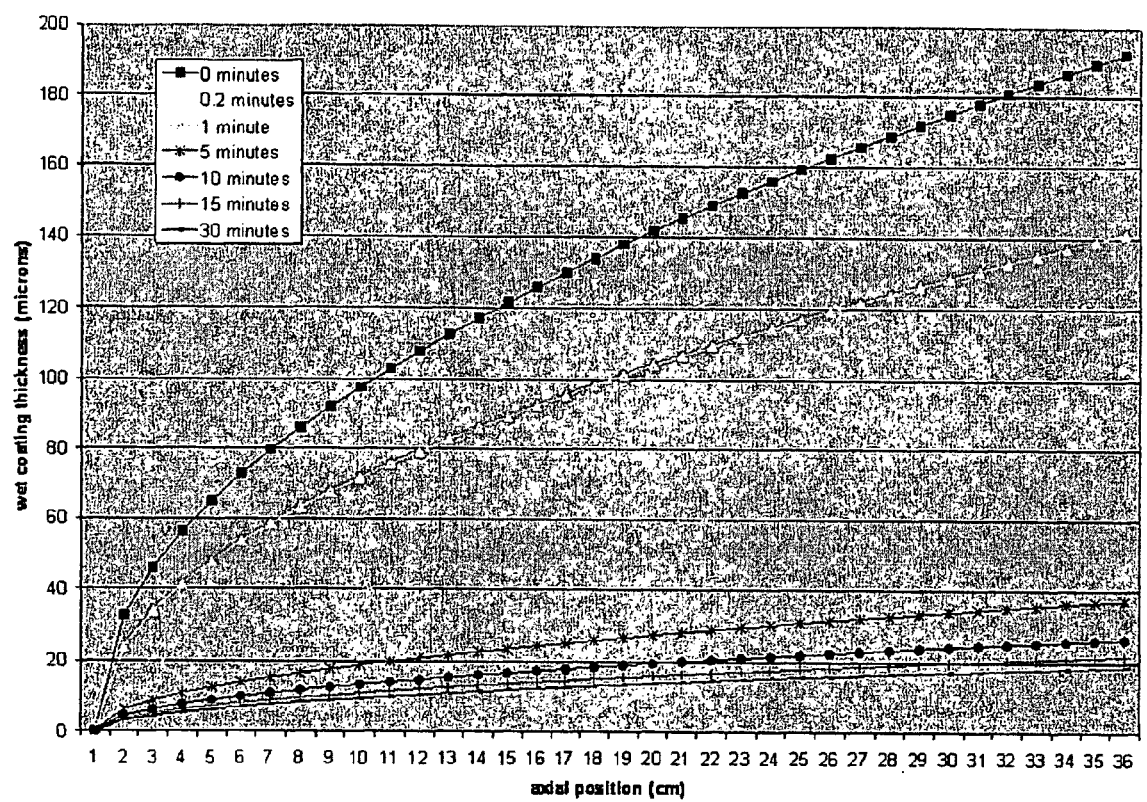
FIG. 5 is the calculated film thickness of a channel that is filled and drained with a washcoat composition.

Model parameters used in FIG. 5 showing the axial profile of coating thickness as a function of time.

Viscosity: 0.006135 Pa-s
Density: 1100 kg/m3
Liquid surface tension: 0.07 N/m
Liquid contact angle: 75 degrees
Hydraulic diameter: 1 mm Washcoating Uniformity Modeling with the Use of Capillary Features to Retain the Liquid on the Microchannel Walls An improvement to uniform liquid retention on the walls of a microchannel that is coated after assembly is enabled by the use of small features created into or out of the microchannel walls. The features are referred to as capillary features and make use of capillary forces to hold or retain a fluid sufficiently uniformly along the length of the microreactor walls as well as from channel to channel.

It should be noted that surface forces, when dominating over gravitational forces, should be sufficient to increase the catalyst interchannel and intrachannel uniformity. Surface forces include adhesion and chemical reaction. An example of adhesion is a sticky fluid that has relatively strong attractive forces with the microchannel wall. The use of polymeric, adhesive, or other adhesion-prone fluids may improve the catalyst uniformity within a microchannel.

Capillary-feature Liquid Uptake Model Results

A 1-D capillary feature liquid retention model was developed assuming that the groove cross-section is rectangular and the groove is oriented such that gravity acts parallel to the groove width and is orthogonal to the length and depth of the groove. The resulting third order non-linear differential equation describing this 1-D system was solved using Mathcad 2001i (MathSoft, Cambridge, Mass.). In order to solve the differential equation, the following boundary conditions were assumed: the liquid depth in the groove is approximately equal to the depth of the groove along the bottom-most edge with respect to gravity and the angle between the liquid and the solid along the bottom and top edges is equal to the thermodynamic contact angle for that liquid/solid/gas interface system.

Figure 6A:
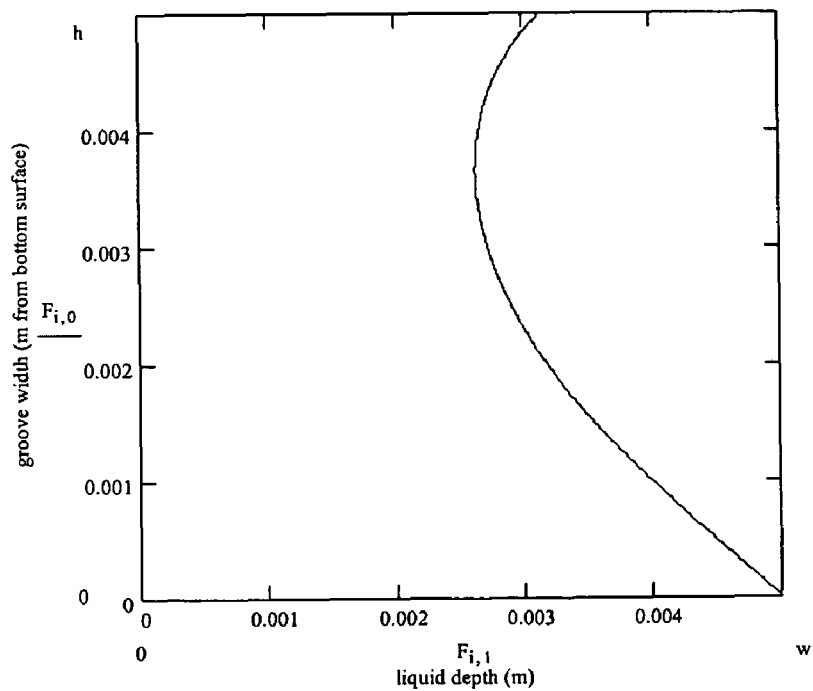
FIGS. 6a and 6b show calculated shape of the meniscus in a horizontal groove.
Figure 6B:
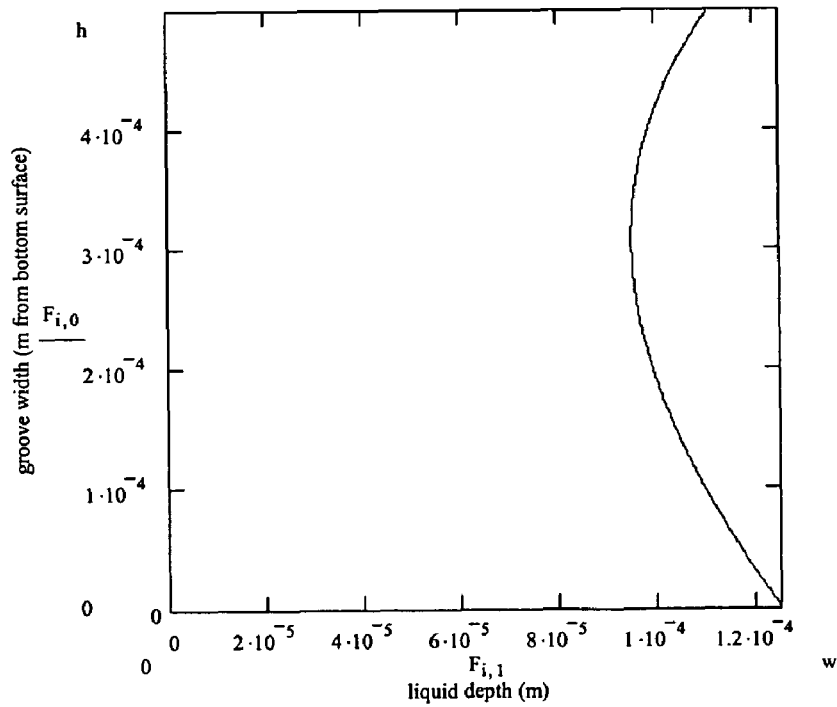

The model is used to predict the shape of the liquid meniscus in the groove (for example see FIGS. 6a and 6b), and to explore the effect of several variables over a wide range of conditions on liquid retention. The variables found to have the greatest effect on the allowable catalyst uptake are groove depth, groove width to depth ratio, contact angle, and gravity factor ratio. The gravity factor ratio is defined as shown in Equation 1 below, where ρ is the liquid density, g is the gravitational constant (i.e. 9.81 m/s$^2$), and σ is the liquid surface tension. The gravity factor ratio for water at room temperature and pressure is about 1.

A general form of the equation for predicting active material uptake in milligrams active material/inch$^2$ (milligrams/6.45 cm$^2$) on a surface with capillary features is given in equation 2 below.

$$\text{gravity factor ratio} = \frac{\frac{\rho g}{\sigma}}{\left[1.344E5 \frac{\text{kg} \cdot \text{sec}}{\text{m}}\right]} \quad \text{(Eq. 1)}$$

Active material uptake (mg/6.45 cm$^2$)=10*($\rho_{liquid}$)*
($w_{catalyst}$)*$f_{area}$*[+2.13119−0.040174*(contact angle)+0.025326*(groove depth)−0.69857*(height/depth)+7.70816E−004*(contact angle)*(groove depth)+0.013161*(contact angle)*(height/depth)−8.42001E−003*(groove depth)*(height/depth)]  (Eq. 2)

Where $\rho_{liquid}$ is the density of the liquid in grams/cm$^3$, $w_{catalyst}$ the mass fraction of active material in the liquid solution, $f_{area}$ is the fraction of area which is covered by the capillary features, contact angle is in degrees, groove depth is in microns (10$^{-6}$ m), and height/depth ratio is unitless.

The model equation in Equation Z is valid only over the range 25-125 micron groove depth, 0.5-10 groove width to depth ratio, contact angles of 10-80 degrees, and gravity factors (Equation 1) of 0.1-10.

In addition, the height/depth ratio must satisfy the following criterion (where contact angle is given in degrees):

height/depth<[1.122E−03*(contact angle)$^2$+8.265E−03*(contact angle)+2.155]

Table 1 compares predictions using the above correlation to those obtained using the full model.

Where rib is defined as a flat wall, neither recessed or protruded, along the microchannel length. It is anticipated that less liquid washcoat solution will be retained on the top of the rib as gravity draining will occur.

TABLE 1

Predictions of active material uptake using correlation and using full 1-D model

| rib (micron) | groove depth (micron) | height/depth | contact angle (deg) | f area | correlation active material uptake (mg/in$^2$) | full model active material uptake (mg/in$^2$) | difference (mg/in$^2$) |
|---|---|---|---|---|---|---|---|
| 50 | 25 | 0.5 | 10 | 0.20 | 0.43 | 0.27 | 0.16 |
| 50 | 25 | 0.5 | 45 | 0.20 | 0.33 | 0.30 | 0.03 |
| 50 | 25 | 0.5 | 80 | 0.20 | 0.23 | 0.32 | −0.09 |
| 50 | 25 | 1 | 10 | 0.33 | 0.59 | 0.37 | 0.22 |
| 50 | 25 | 1 | 45 | 0.33 | 0.50 | 0.46 | 0.04 |
| 50 | 25 | 1 | 80 | 0.33 | 0.41 | 0.52 | −0.11 |
| 50 | 25 | 2 | 10 | 0.50 | 0.50 | 0.30 | 0.20 |
| 50 | 25 | 2 | 45 | 0.50 | 0.60 | 0.58 | 0.02 |
| 50 | 25 | 2 | 80 | 0.50 | 0.69 | 0.76 | −0.07 |
| 50 | 125 | 0.5 | 10 | 0.56 | 2.80 | 3.77 | −0.97 |
| 50 | 125 | 0.5 | 45 | 0.56 | 4.03 | 4.16 | −0.14 |
| 50 | 125 | 0.5 | 80 | 0.56 | 5.25 | 4.42 | 0.83 |
| 50 | 125 | 1 | 10 | 0.71 | 3.03 | 3.77 | −0.74 |
| 50 | 125 | 1 | 45 | 0.71 | 4.76 | 4.94 | −0.18 |
| 50 | 125 | 1 | 80 | 0.71 | 6.49 | 5.59 | 0.90 |
| 50 | 125 | 2 | 10 | 0.83 | 2.18 | 2.46 | −0.28 |
| 50 | 125 | 2 | 45 | 0.83 | 4.59 | 4.80 | −0.21 |
| 50 | 125 | 2 | 80 | 0.83 | 7.00 | 6.32 | 0.67 |
| 50 | 125 | 3 | 45 | 0.88 | 3.84 | 4.05 | −0.21 |
| 50 | 125 | 5 | 80 | 0.93 | 5.83 | 6.29 | −0.46 |
| 250 | 25 | 0.5 | 10 | 0.05 | 0.10 | 0.06 | 0.04 |
| 250 | 25 | 0.5 | 45 | 0.05 | 0.08 | 0.07 | 0.01 |
| 250 | 25 | 0.5 | 80 | 0.05 | 0.06 | 0.08 | −0.02 |
| 250 | 25 | 1 | 10 | 0.09 | 0.16 | 0.10 | 0.06 |
| 250 | 25 | 1 | 45 | 0.09 | 0.14 | 0.13 | 0.01 |
| 250 | 25 | 1 | 80 | 0.09 | 0.11 | 0.14 | −0.03 |
| 250 | 25 | 2 | 10 | 0.17 | 0.17 | 0.10 | 0.07 |
| 250 | 25 | 2 | 45 | 0.17 | 0.20 | 0.19 | 0.01 |
| 250 | 25 | 2 | 80 | 0.17 | 0.23 | 0.25 | −0.02 |
| 250 | 125 | 0.5 | 10 | 0.20 | 1.01 | 1.36 | −0.35 |
| 250 | 125 | 0.5 | 45 | 0.20 | 1.45 | 1.50 | −0.05 |
| 250 | 125 | 0.5 | 80 | 0.20 | 1.89 | 1.59 | 0.30 |
| 250 | 125 | 1 | 10 | 0.33 | 1.41 | 1.76 | −0.35 |
| 250 | 125 | 1 | 45 | 0.33 | 2.22 | 2.30 | −0.08 |
| 250 | 125 | 1 | 80 | 0.33 | 3.03 | 2.61 | 0.42 |
| 250 | 125 | 2 | 10 | 0.50 | 1.31 | 1.48 | −0.17 |
| 250 | 125 | 2 | 45 | 0.50 | 2.75 | 2.88 | −0.12 |
| 250 | 125 | 2 | 80 | 0.50 | 4.20 | 3.79 | 0.40 |

By comparison, the anticipated uptake on the walls of the microchannel in the absence of the capillary features based entirely on a fill-and-drain process is less than 0.1 mg/in$^2$. Thus many washcoating steps are necessitated to gain high loadings and where the non-uniformity bias is retained on each washcoating step.

When the depth of the liquid was predicted to be less than the depth of the groove at any point in the groove, the model limits were exceeded and may not be valid. In the range simulated for the mathematical model, the contact angle and height to depth ratio were the only significant factors in determining whether the model limits were exceeded, which occurred near groove width to depth ratios of 2.3 and 4.5 for contact angles of 10 and 45 degrees, respectively. Under some conditions, the liquid retention per groove was significant for groove depths and/or widths as large as 5 mm. The liquid retention values as high as 80 ml per 6.45 cm$^2$ are predicted for some conditions in the range simulated for the mathematical model (i.e. groove depths of 125 ml or less), far above the expected liquid retention on a flat vertical plate without the capillary features. Liquid uptake is, in general, higher as groove depth and contact angle are increased (although as the contact angle approaches 90 degrees and higher, the capillary features may be more difficult to wet to fill the grooves initially). As groove width is increased near or beyond 5 mm, the forces created by the large capillary features will be overcome by gravitational effects and the liquid retention in the capillary features will drop significantly.

Capillary Features in Microchannel Walls

Capillary features when placed within the wall of a microchannel or protruding above the walls are useful for chemical unit operations (including for reactors, separators, and heat exchangers) to enable the selective retention of a liquid on or near the microchannel wall. The features may be of any shape (rectangular, circular, trapezoidal, other) as long as they provide at least one critical dimension less than a defined parameter based on the fluid properties such that capillary forces are stronger than gravitational forces to prevent draining or slip along the microchannel walls.

Capillary features protruding from the average surface of a microchannel wall are preferably formed of the same material as the plate which forms the microchannel wall. The capillary features could be formed as through slots or holes in a thin metal shim that is stacked adjacent to a wall shim prior to diffusion bonding. The resulting structure would be similar to recessed features in the first microchannel wall.

Capillary features may be placed along the length of the microchannel at the desired location to create a uniform or tailored intrachannel distribution. To promote good channel-to-channel uniformity, the same profile of capillary features are placed along every parallel microchannel in an array of microchannels. The features are preferentially aligned normal to the direction of gravity to minimize draining with the direction of gravity. The features may be aligned at an angle with respect to the direction of gravity during draining. The features may be oriented parallel to the direction of gravity if they are short and discontinuous. On a microchannel wall, there are preferably three, five, ten, or more features in a group.

In one embodiment a tailored profile may leave more capillary features and thus more catalyst solution near the front of a reactor section where the demand for catalyst is higher. In another embodiment for the case of an exothermic reaction, such as a selective oxidation, the amount of catalyst placed or retained near the front of the reactor may be reduced to in turn reduce the amount of heat released and thus unwanted temperature rise. In a third embodiment, the location and size of capillary features may be tailored on the edge channels of a microchannel device such that the heat release is reduced near the device edge. For example, in a layer of a microchannel device, there may be a higher concentration of capillary features near the center of the layer than near an edge so that more coating is applied near the center of the device. Thus, on a layer comprising an array of microchannels with at least one central microchannel and two edge microchannels, in some embodiments the at least one central channel can have a higher concentration of capillary features than the concentration in either of the two edge channels; this can be reversed if greater catalyst concentration is desired along the edge. This may create an advantaged mechanical design wherein the local edge temperature is reduced near an area of high thermal strain. The capillary features may be used to control or tailor the process performance as measured in conversion and selectivity for a given capacity or flow rate per unit volume. The features may also be used to minimize mechanical strains in high strain regions of the apparatus by reducing the local heat release and thus reduce the resulting temperature gradient.

Methods for Wash-coating to Produce Uniform or a Tailored Profile

1) Using Capillary Features

To retain a liquid (either catalyst precursor or other). The fluid is filled within a microchannel or an array of parallel microchannels and then drained after leaving behind fluid within the capillary features on the wall. The fluid may then be dried or drained to leave behind active agent on the walls. The fluid may be aqueous based or comprising a solution of solid nanoparticles, polymeric, or any liquid coating composition.

Capillary Feature Retention Modeling

Capillary Feature without Gravity Force

Figure 7:
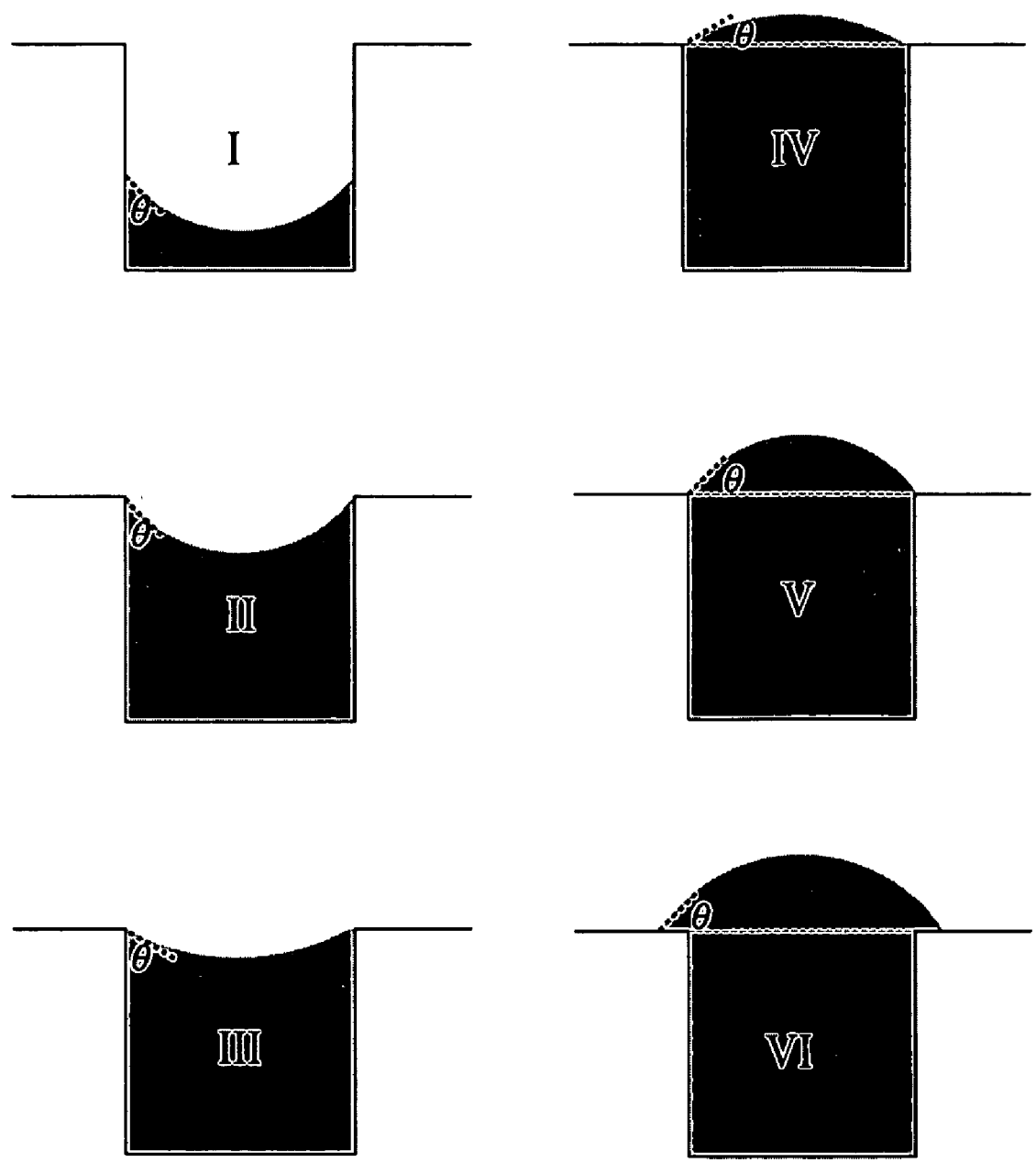
FIG. 7 illustrates the stages of filling of a capillary feature (niche).

FIG. 7 shows six stages of filling a capillary niche, named case I through VI. The niche is shown oriented upward for convenience. The radii of curvature of the surfaces are depicted as though constant across the surface in each case, as though gravity was unimportant.

In case I, the hydrostatic angle of contact $\theta$ is controlled by thermodynamics; i.e., $\theta=\alpha$, where $\alpha$ is the thermodynamic contact angle, a function of the composition of the liquid, the solid, and the vapor. As one adds more liquid, eventually the surface rises to the point the line of contact reaches the corner, case II. The hydrostatic angle of contact is still equal to the thermodynamic contact angle. Now as one adds still more liquid, the surface cannot maintain the thermodynamic contact angle because of the discontinuity in the orientation of the surface at the corner. Instead, the line of contact remains at the corner while the hydrostatic angle of contact increases, as show in Case III. Eventually this angle becomes a right angle and the niche is filled. Adding still more liquid causes the surface to expand beyond the top of the niche, Case IV. The pertinent hydrostatic angle of contact is now measured relative to the surface outside the niche; this angle is denoted $\theta'$. For Case IV, $\theta'<\alpha$. Adding still more liquid increases the curvature of the surface until $\theta'=\alpha$, Case V. Adding still more liquid now causes the point of contact to move beyond the corner of the niche and the liquid spreads onto the surface outside the niche, Case VI. The surface shape once again maintains $\theta'=\alpha$. Thus, for Cases I or VI, the boundary condition on the shape of the surface is the slope, set by the thermodynamic contact angle. The derivative of y is fixed and the location is found from solving an ODE. For Cases II through V, the boundary condition is that the surface is bounded by the corners of the niche. The value of the y is fixed at a location and the derivative (slope) is found from solving an ODE.

Capillary Features with Gravity (2-D Model)

Now orient the niche so it faces horizontally to the right (FIG. 8) and do not ignore the effect of gravity.

First, we need to relate the capillary pressure difference to the shape of the surface.

Figure 8:
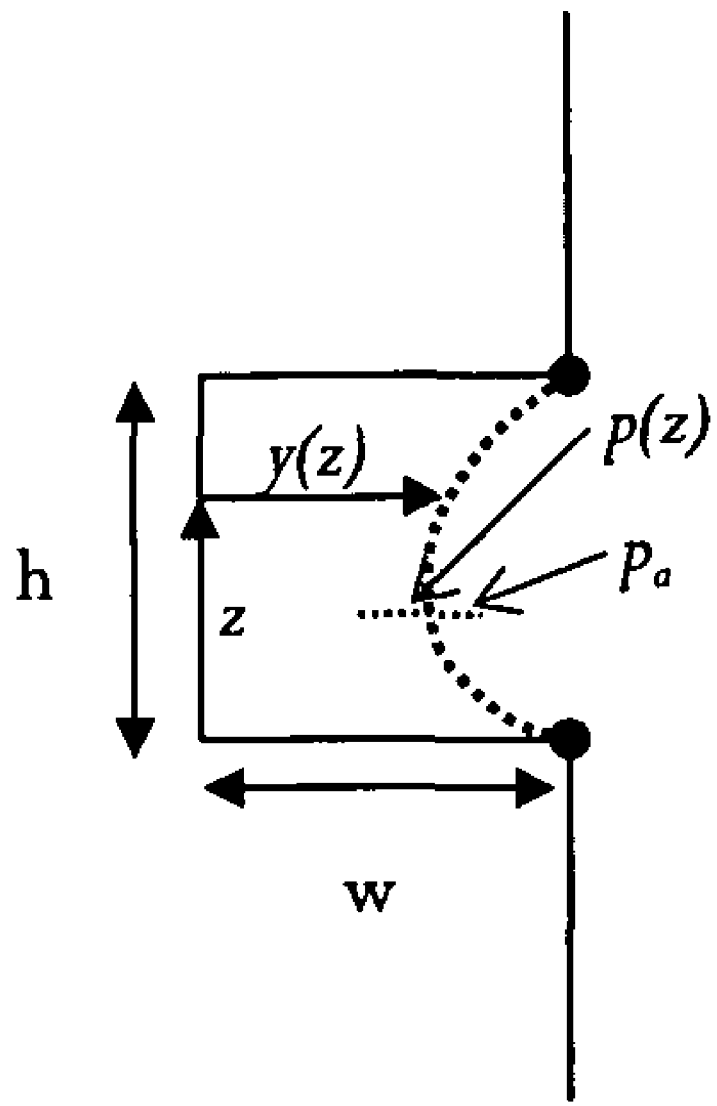
FIG. 8 is a schematic illustration of capillary retention.

Consider a surface described by the function y=f(x,z) (see FIG. 8). Next consider the 2-dimensional case where in fact y does not vary with x. That is, the plane z=constant intersects the surface along a straight line, while the plane x=constant intersects the plane along a line in the x-plane described by $$y=y(z)$$

If near some value of z this line is locally a circular arc, then locally it is described by $$y^2+z^2=R^2$$

where R is the radius of curvature. Differentiating once with respect to z gives $$yy'+z=0$$

Differentiating again gives $$y'^2+yy''+1=0$$

Also, substituting the first differentiation into the formula for the arc gives $$y^2+(-yy'')^2=R^2$$

Solving for y gives $$y = \pm \frac{R}{(1+y'^2)^{1/2}}$$

where the sign depends on the arrangement of the coordinate system and within it the convexity or concavity of the arc. Substituting into the second differentiation gives $$y'^2 + 1 \pm \frac{R}{(1+y'^2)^{1/2}} y'' = 0$$

Solving for 1/R gives $$\frac{1}{R} = \pm \frac{y''}{(1+y'^2)^{3/2}}$$

where the actual sign depends on the convexity or concavity of the arc.

This radius R describes the curvature in the y-z plane. If as assumed above there is no variation of y with x, then the radius of curvature in the y-x plane is infinite. Then the capillary pressure difference across the curved surface is $$\Delta p = \frac{\sigma}{R} = \pm \sigma y''(1+y')^{-3/2}$$

ΔP=Pressure drop between liquid and gas above it.
σ=Surface tension

Besides capillary forces, other surfaces forces like chemical coating may also contribute to the retention of liquid in the capillary features. A general form of above equation can be:

$$\Delta p = \frac{\sigma}{R} + F_{surface} A_{surface} = \pm \sigma y''(1+y')^{-3/2} + F_{surface} A_{surface}$$

For this analysis, we will assume $F_{surface}=0$
The capillary niche is shown here:
The liquid surface is described by y=y(z). The pressure outside the liquid is constant at $p_a$. The pressure inside the liquid is a function only of z, p=p(z). Therefore, the pressure difference is $p(z)-p_a$, which is the capillary pressure difference:

$$p(z)-p_a = \Delta p = \sigma y''(1+y'^2)^{-3/2}$$

Differentiating this with respect to z gives $$\frac{dp}{dz} = \sigma y'''(1+y'^2)^{-3/2} - \sigma y'' \frac{3}{2}(1+y'^2)^{-5/2}(2y'y'')$$

From hydrostatics, we have $$\frac{dp}{dz} = -\rho g$$

where, ρ=density of liquid, kg/m^3
g=acceleration due to gravity, m^2/s $$y'''(1+y'^2) - 3y'y''^2 + \frac{\rho g}{\sigma}(1+y'^2)^{5/2} = 0$$

is the differential equation that describes the liquid-vapor interface in a capillary
The boundary conditions are:
1) y(0)=w
2) y'(0)=y'(h)=cot(θ)
where, w=Width of the capillary structure
h=height of the capillary structure
θ=Contact angle with the surface Examples of Capillary Features Capillary features either are recessed within a wall of a microchannel or protrude from a wall of the microchannel into the flow path that is created above the microchannel wall. Laser cutting is one method to create recessed features. The features create a spacing that is less than 1 mm, more preferably 250 microns or less, still more preferably a spacing of 100 μm or less. Protruded features may be produced by roll forming or knurling methods.

Capillary features, those features used to hold liquid substances, have been successfully fabricated by the following manufacturing methods: Laser etching, which is a method by which a laser creates features into the surface of material by regulating the speed and power of the laser, to remove base material and create the intended feature. A second method used to successfully fabricate capillary features is by Electrical Discharge Machining (EDM). This process uses a small diameter wire to make the intended feature by burning away a conductive base material. Lastly, capillary features have been fabricated by roll forming of the intended features into thin material. This process is similar to knurling features into round parts, except instead of round parts flat material is used. This process requires a round tool, with the features made into it, to be placed on the base material. As the tool moves over the material, features are created, as the tool uses applied pressure to move the base material.

The features may take any geometry and are defined by having at least one dimension (length, width, or depth) that is below a critical dimension for fluid retention. The critical dimension is a function of the fluid and surface interface properties (see modeling section).

Preferred ranges for capillary feature depth (as defined as recessed or protruded distance normal to the direction of gravity) are less than 2 mm. More preferrably less than 1 mm. Most preferably from 0.01 mm to 0.5 mm. It should be noted that the microchannel itself can exert a capillary force, however this force is aligned with gravity and the channel is open to partial draining of the washcoating fluid. A natural liquid height will be retained within the microchannel above the fluid reservoir level after draining as a result of capillary forces from the channel. It should further be noted that this height may well be less than the desired coating length of the microchannel.

The preferred range for the width of the capillary feature (as defined as the open distance parallel to the direction of gravity) is less than 2 mm. More preferrably less than 1 mm. Most preferably from 0.1 to 0.5 mm.

The length of the capillary feature may be any length and is preferably orthogonal to the direction of gravity. The length may span the microchannel width or any fraction therin. In some embodiments, the length of the capillary feature may be longer than the width of the microchannel such that it spans multiple parallel microchannels. This may be particularly advantageous to form longer capillary features during the shim manufacturing process.

The wet coating thickness may substantially be the same as the depth of the capillary feature. The dry coating thickness will be substantially reduced, as the bulk of the coating liquid solution is usually aqueous or organic liquid that is removed on drying. In some embodiments, the final dry coating thickness may range from about 1 micron to 250 microns. A preferred range of coating thicknesses is from about 5 microns to about 25 microns. When capillary features are present, coating thickness is averaged with appropriate deductions or additions for the depth of the capillary features.

The length of a horizontally-aligned capillary feature is defined from the direction perpendicular to the microchannel length. The depth is the distance which the feature sinks into or protrudes from the microchannel surface. The width of a capillary feature is the direction perpendicular to both length and depth. In some embodiments, a coated section of a microchannel has a substantially straight length (height and width may be variable).

Measuring the coating thickness is performed ex situ by cutting the device into cross sections and taking SEM pictures to quantitatively measure the coating thickness.

Multiple features may be included within any given microchannel. Including features that protrude or recess at different depths into or out of the microchannel wall.

Figure 9A:
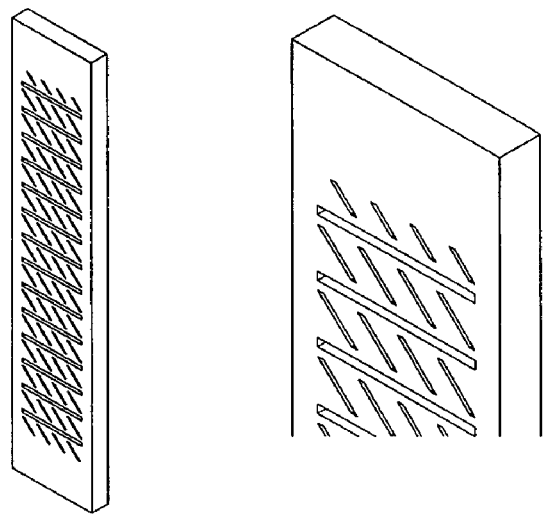
FIGS. 9a-9i illustrate various embodiments of capillary features.

One example feature contains horizontal (gravity points down) recessed capillary features offset by angled recessed features. See FIG. 9a. Horizontal features are especially preferred to create a stop for fluid draining by gravity down the microchannel walls. Not all capillary features however need to be horizontal to uniformly retain washcoat solution. The variations may be added to tailor the retention of washcoating solution (or any other liquid fluid solution that may be applied to the walls of a microchannel).

There are several parameters, which Include: Depth, width, and spacing for each feature. Any or all of these parameters may be varied throughout the channel in order to tailor the catalyst loading in specific section of the device. More complex patterns can be formed by grouping sub-patterns together. Each sub-pattern has its own set of parameters that can be controlled independently from each other set of sub-patterns, in order to maximize uptake and/or tailor the catalyst loading.

Capillary features may be used to tailor the application of a catalyst or any other washcoating solution along the length of a microchannel wall. More catalyst may be preferred near the reactor inlet, and thus deeper and/or more closely spaced recessed or protruded capillary features may be placed in this zone. Near the end of the reaction zone, less catalyst may be required as the reaction has proceeded near completion. It may be preferable to reduce the catalyst loading near the end of the catalyst section. Thus, in some embodiments, a reaction microchannel, with one inlet and one outlet, has a greater density of capillary features mear the inlet than near the outlet; or, conversely, has greater density of capillary features mear the outlet than near the inlet.

Figure 9B:
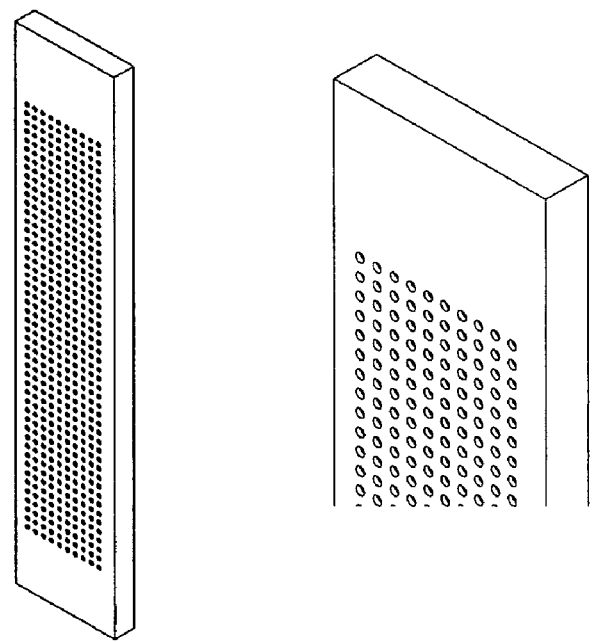

As shown in FIG. 9b, the features may take the form of recessed or protruded dots, circles, hemispheres, cylinders, and the like. The spacing between protruded capillary features creates capillaries—preferably these spacings have the capillary dimensions described above.

Figure 9C:
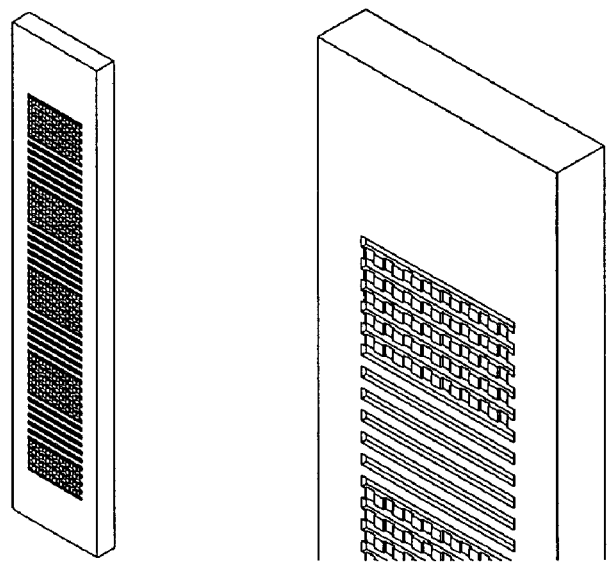

FIG. 9c shows alternating sections of protrusions and recessed areas. Capillary features may include straight, horizontal recessed channels or straight protrusions with straight capillary spacings therebetween. In another alternative, capillary features may include a square wave pattern.

Figure 9D:
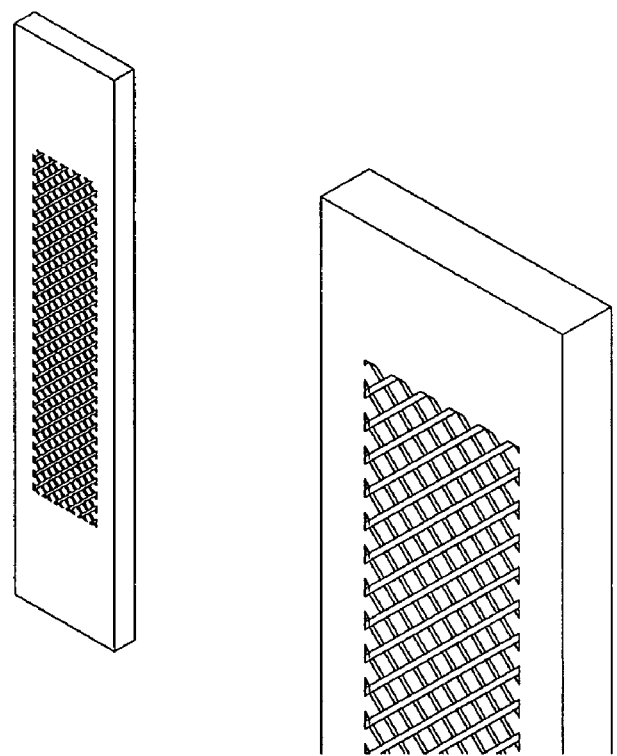
Figure 9E:
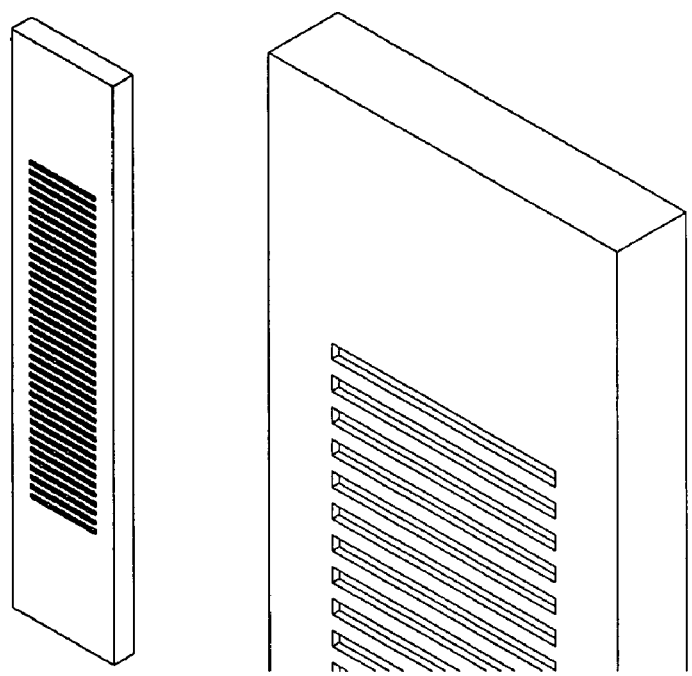
Figure 9F:
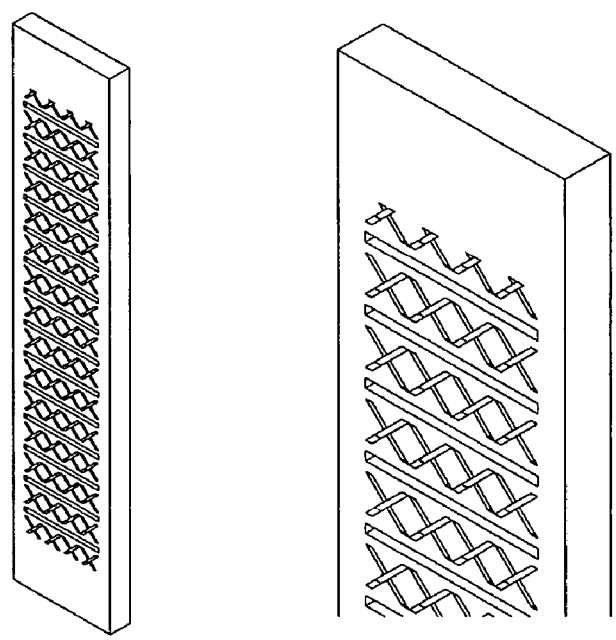

FIG. 9d illustrates cross hatched capillary features. FIG. 9e illustrates simple horizontal features. while 9f shows horizontal features alternating with diagonal features. FIG. 9e shows capillary features that consist essentially of diagonal features.

Figure 9G:
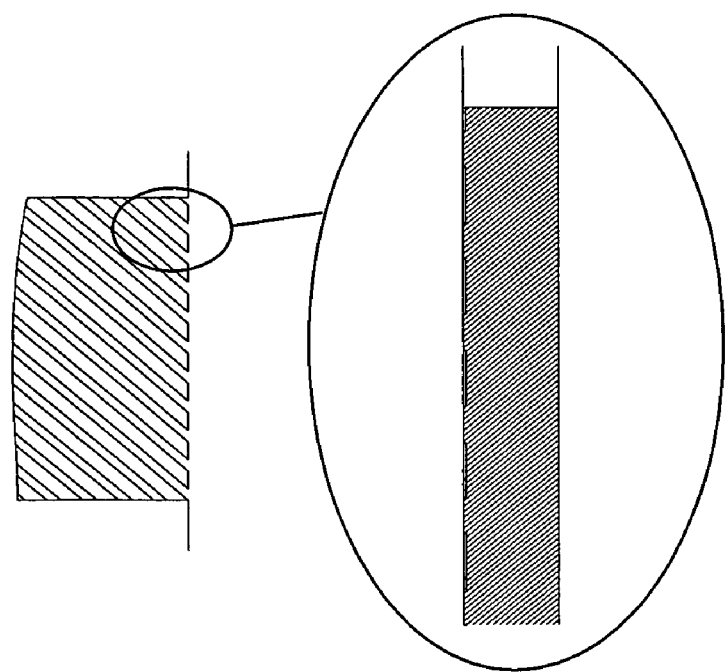

As illustrated in FIG. 9g capillary features can be rounded protrusions, preferably in the form of columns of protrusions, more preferably, at least 3 columns of protrusions in which protrusions in a column are not aligned protrusions in adjacent columns. Alternatively, the protrusions could be recesses, in some embodiments recesses with rounded edges.

Figure 9H:
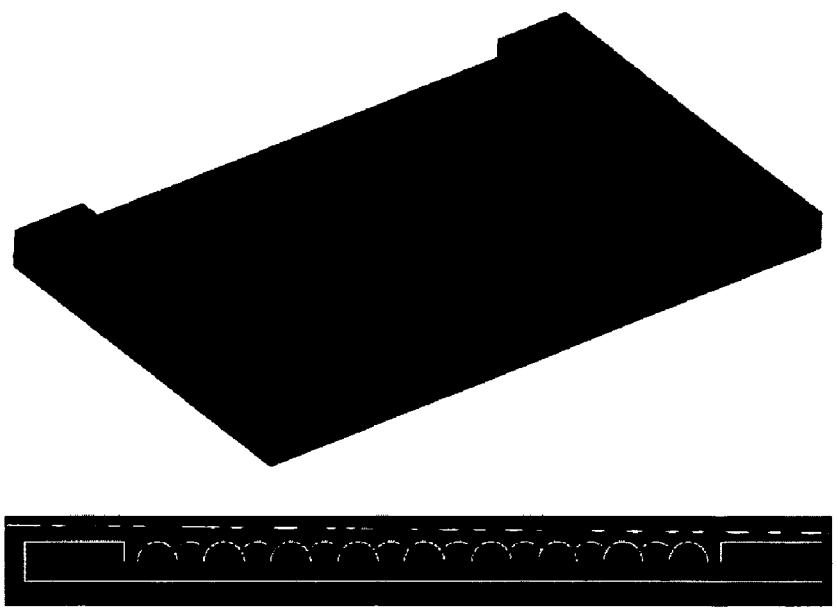
Figure 9I:
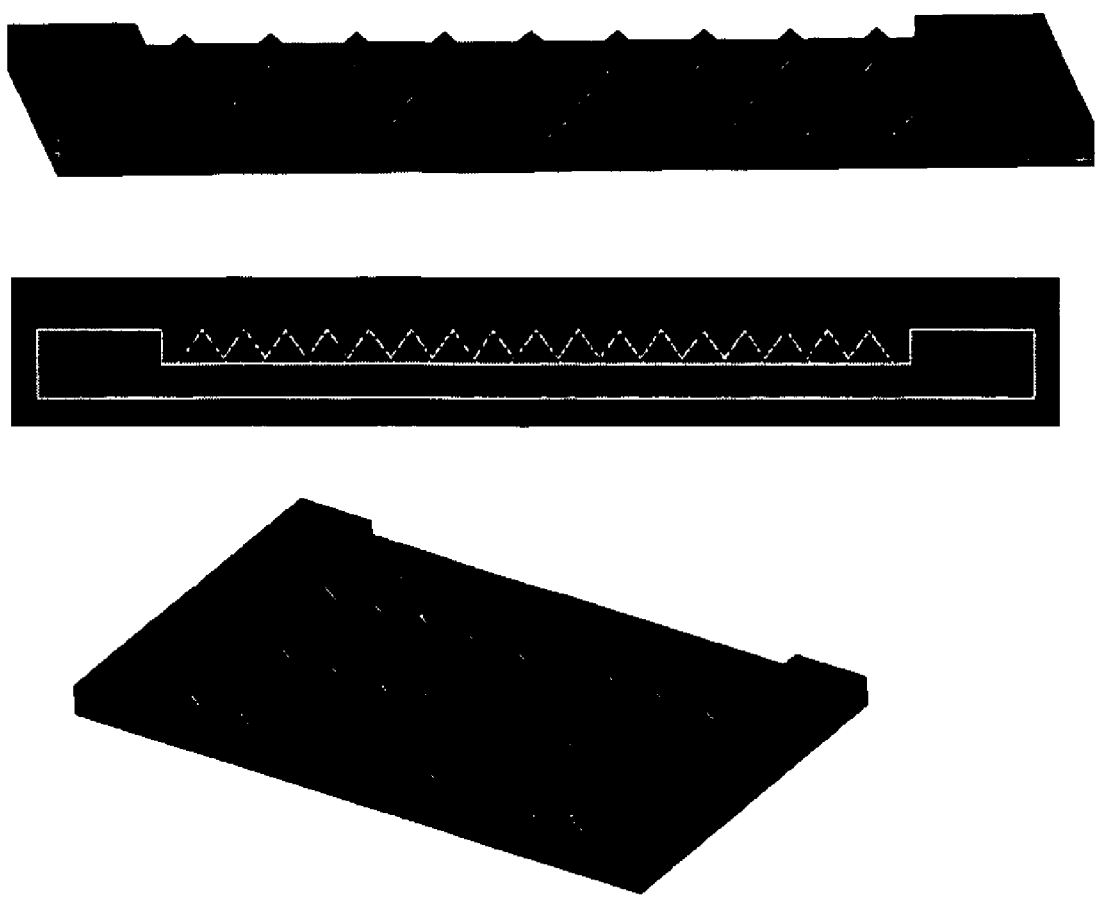

FIG. 9h shows trigonal prisms as the protruded capillary features. Again, in alternative embodiments, the protrusions could be recesses.

For uniform coatings, the capillary features extend substantially over the length of a microchannel or the length desired for a uniform coating. In some embodiments, a microchannel can have capillary features over 50% or less of its length, in some embodiments over 20% or less of its length.

It may be mentioned that in some preferred embodiments, the cross-sectional SEM view of a uniform layer will show a smooth surface, as is shown for the aluminide layers.

Electroless Plating

The use of electroless plating of catalytic metals on reactor walls, both conductive and non-conductive, might also create a uniform coating. Such an electroless plating solution could comprise a water soluble metal salt, a reducing agent such as hydrazine hydrate, possibly a stabilizer such as EDTA to prevent precipitation of the plating metal, possibly an accelerator such as 3,4-dimethoxybenzoic acid or an acid such as acetic acid to adjust the pH for optimum plating. For a microchannel reactor the electroless plating solution is preferably filled (to the desired height) within the channels prior to the initiation of the reaction. The solution could be introduced at room temperature or below and then heated using the embedded microchannels to the requisite plating temperature. In some applications it may be important that the plating process end before the plating solution is drained, particularly if the draining process is long relative to the plating process, to achieve a uniform coating. This can be accomplished by, for example, controlling a plating composition/reaction in which one of the essential reactants is depleted before the draining process begins. Another approach would be to reduce the plating temperature prior to draining. It is contemplated that electroless plating is a good candidate for making uniform coatings in microchannels and it is further contemplated to be used for microchannel coatings; however, this technique has not been proven in microchannels, and the technique would not necessarily result in uniform coatings in microchannels. For example, in addition to the draining issues, the plating liquid should be selected to be stable in microchannels so that particles will not form in solution and drift by gravity. Also, solutions cannot be stirred in microchannels so concentration gradients are likely to occur, and the effect of these gradients isn't known.

The microchannel wall could be ceramic, metal, alumina-coated aluminide, etc. Preferred metals for the electroless deposition include Cu, Ni, Fe, Co, Au, Ag, Pd, Pt, Sn, Rh, Ir and combinations thereof. It is anticipated that the composition of the plating bath, the rate of plating and plating conditions, eg., temperature, will effect the morphology of the plated coating, i.e., average metal crystalline size. Control of such parameters could yield a metal crystalline size smaller and with a narrower range than expected for coating processes that are non-reactive, e.g., washcoating of an aqueous metal salt solution.

Other Coating Modifications

Various other modifications can be used to enhance adhesion or other properties of alumina coatings over the alumina scale. An alumina coating can be deposited using an alumina sol or slurry.

To achieve greater uniformity in microchannels, coating solutions may contain surfactants such as polyvinylalcohol (PVA), and polyvinylpyrrolidone. Surfactants reduce the contact angle of a fluid to the wall which allows the fluid to more fully wet and cover the microchannel walls.

Draining Liquid Coating Compositions

One problem with washcoating is that during draining a liquid from a microchannel, the top of the microchannel(s) is effectively drained while the bottom of the microchannel(s) remains wet because some liquid is retained in the microchannel(s) by capillary action. One technique to remove the last liquid is by purging with a gas flow; however, when liquid is being removed from a plurality of microchannels (for example, at least 2, at least 10, or at least 100 microchannels) the flow of gas is, or becomes, unequal through the microchannels, resulting in nonuniform channel-to-channel coating thickness. The non-uniformity may arise in two ways: (1) slower liquid removal from a channel which allows more deposition onto the channel wall(s), or (2) faster gas flow through some microchannels that strips off coating from the channel wall(s). To minimize this effect, purge flow through the microchannels is controlled to a low rate such that flow through each of the microchannels varies by 70% or less, preferably 40% or less (as a percent of the highest flow). This flow can be caused by back pressure or by pulling with vacuum through a drain (typically a manifold inlet or manifold outlet). A more preferred method is to use a suction conduit that is moved through a manifold to suck fluid from a subset of microchannels (preferably one microchannel) of a set of microchannels that are connected to the manifold; in this method, drainage suction applied to (or conversely, gas flow through) microchannels is made more equal than if suction were applied to the manifold as a whole. One issue with applying suction to a connecting channel that feeds more than 2 or more than 10 or more channels is the resulting pressure differential created by flow in the connecting channel circuit. After the first channel (as defined with the lowest pressure drop) is drained, the loss of suction or continuous liquid flow makes it challenging to remove the liquid retained in the remaining channels. This is analogous to the difficulting in draining the final liquid from a soda can with suction from a straw.

Another possibility to improve coating uniformity is to use a wick to assist in draining liquid from microchannels. For this purpose, wicking features can be integral with the microchannel device or inserted temporarily during the draining process but removed prior to use. The wicks could be used to create a capillary siphon effect to drain the remaining liquid.

To control height of a coating solution in microchannels, a watch tube can be employed. A watch tube is a clear tube that is connected to the microchannel device. A coating liquid can be injected into a port of a microchannel device—a watch tube is connected to the microchannel device (for example by a w-connection with a syringe attached to the center of the W with one side of the W connected to the microchannel device and one side connected to the watch tube); in this fashion, the height of the liquid level in the watch tube matches the height of liquid in the microchannels if the hydraulic diameter of the watchtube is similar to the channel hydraulic diameter for the case when the hydraulic diameter of the microchannel is sufficiently small to create a capillary force. For hydraulic diameters less than 2 mm, it is anticipated that some capillary force will be exerted such that a liquid rise will occur especially in a non-wetted microchannel. In another selective coating technique, coatings are excluded from selected microchannels by temporarily plugging (such as with a removeable cap) selected channels so that gas pressure prevents those channels from filling while other unplugged channels are filled with liquid while gas escapes from an exit port.

Catalyst Coatings

Catalysts can be applied using techniques that are known in the art. Impregnation with aqueous salts is preferred. Pt, Rh, and/or Pd are preferrred in some embodiments. Typically this is followed by heat treatment and activation steps as are known in the art. Salts which form solutions of pH>0 are preferred.

Other Liquid Coating Techniques

Coatings could also be applied onto microchannel walls by filling channels to the desired height with a liquid coating composition and removing volatile components (typically solvent) under reduced pressure. Care may need to be exercised to avoid bubbling defects.

Another way coatings could be applied to microchannel walls is to used supersaturated washcoat solutions or to cool the solutions in a microchannel to create supersaturation in situ. Solids will then deposit onto the microchannel walls. This technique offers a potential for selective coating by using an adjacent cooling channel to cool selected portions of a microchannel, for example a section that is no more than 50% (or no more than 20%) of the length of the microchannel can be cooled selectively. The amount of applied cooling is small and controlled such that the wall is preferentially cooled while the liquid in the channels is substantially not cooled thus avoiding the formation of particulates in the bulk liquid.

Reactions

The coated microchannel apparatus is especially useful when used with a surface catalyst and at high temperature, for example, at temperatures above 180° C., above 250° C., above 500° C., in some embodiments 700° C. or higher, or in some embodiments 900° C. or higher.

In some aspects, the invention provides a method of conducting a reaction, comprising: flowing at least one reactant into a microchannel, and reacting the at least one reactant in the presence of a catalyst within the microchannel to form at least one product. In some embodiments, the reaction consists essentially of a reaction selected from: acetylation, addition reactions, alkylation, dealkylation, hydrodealkylation, reductive alkylation, amination, ammoxidation, ammonia synthesis, aromatization, arylation, autothermal reforming, carbonylation, decarbonylation, reductive carbonylation, carboxylation, reductive carboxylation, reductive coupling, condensation, cracking, hydrocracking, cyclization, cyclooligomerization, dehalogenation, dimerization, epoxidation, esterification, exchange, Fischer-Tropsch, halogenation, hydrohalogenation, homologation, hydration, dehydration, hydrogenation, dehydrogenation, hydrocarboxylation, hydroformylation, hydrogenolysis, hydrometallation, hydrosilation, hydrolysis, hydrotreating (HDS/HDN), isomerization, methylation, demethylation, metathesis, nitration, polymerization, reduction, reformation, reverse water gas shift, Sabatier, sulfonation, telomerization, transesterification, trimerization, and water gas shift. Combustion is another preferred reaction. Hydrocarbon steam reforming is especially preferred (such as methane, ethane or propane steam reforming).

EXAMPLES

Uniform Coatings in a Multichannel, Microchannel Device

Figure 10:
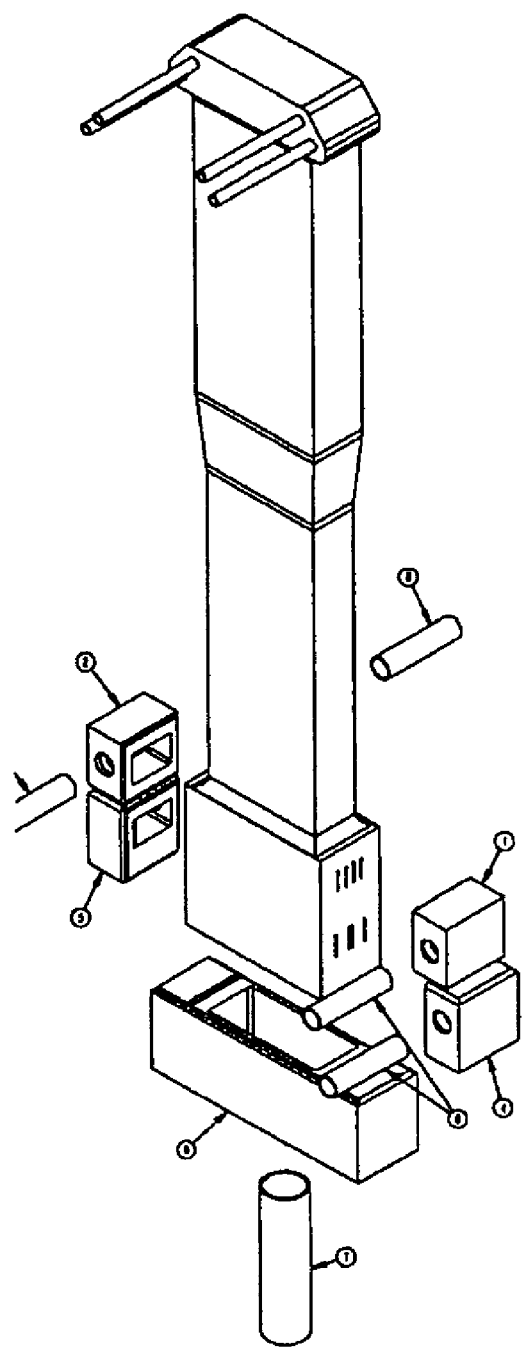
FIG. 10 is a partly exploded view of a multichannel, microchannel device in which the interior microchannels were coated with aluminide.

A microchannel device (FIG. 10) having 48 sets (4×12) of parallel channels, with each set consisting of 5 individual channels. The device is designed for steam reforming of methane (SMR) and contains an integrated combustor (Fuel, Air and Exhaust for the combustion and Reactant and Product for the SMR). The device is over 20 inch (50 cm) long, making the aluminidization circuit over 40 inch (1.0 m) long (Exhaust connected to Fuel and Air, Product connected to Reactant). The Fuel and Air channels are in communication via an array of jet holes in each pair of channels.

Figure 11:
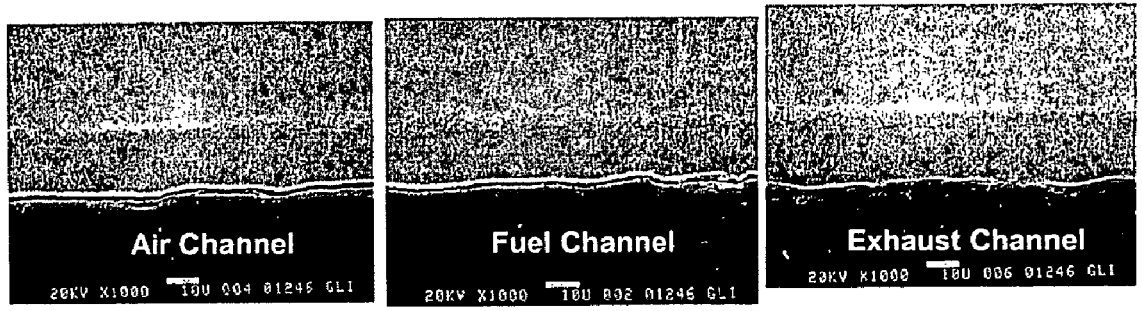
FIGS. 11 and 12 are cross-sectional SEM micrographs of aluminidized channels within the device of FIG. 10.
Figure 12:
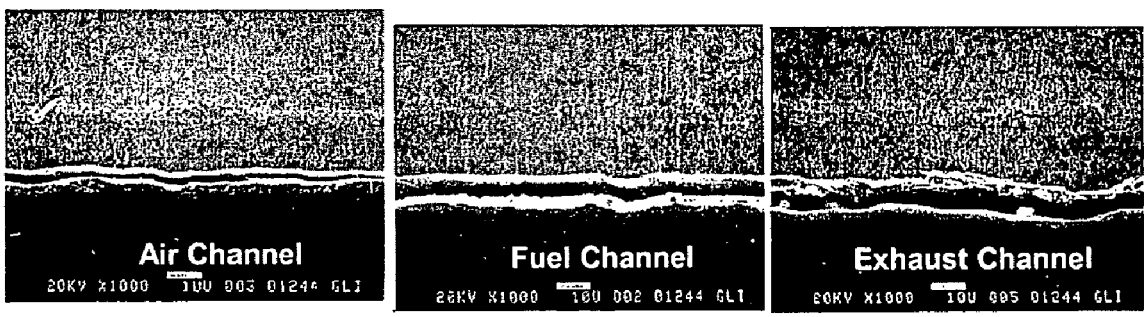

The SMR channels were blanketed off with an argon flow while channels in the combustion circuit were aluminidized. Calculations showed that the flow of aluminidizing gas through the microchannels was highly non-uniform with flow rates in some channels 10 times greater than others, while the surface area within each microchannel was relatively similar. This difference in flows is due to the complex design of the channels and manifold region, where the flow distribution design was developed for flows during operating conditions (much higher flowrates by more than 10×) than the low flow-rates used during the aluminidization process. The CVD vapor flow was fed from the exhaust manifold, flowed through the exhaust channels, through a u-bend and then into the fule and air channels and exited through the fuel and air manifolds. After aluminidization, the device was cut open and various channels were inspected by SEM. Cross-sectional samples were viewed at the midpoint of the device (FIG. 11) and near one end—this end is both near the start of the aluminidization circuit (exhaust channel) and the near end of the aluminidization circuit (air and fuel channels), FIG. 12.

From the SEM data it can be seen that the aluminide coatings were highly uniform both along the length of each channel as well as channel-to-channel, despite the large difference in channel-to-channel flow rates. In each case, coating thicknesses appeared to be within about 10%. Additionally, the coatings appeared to be essentially defect-free.

Coatings at Corners

Figure 13A:
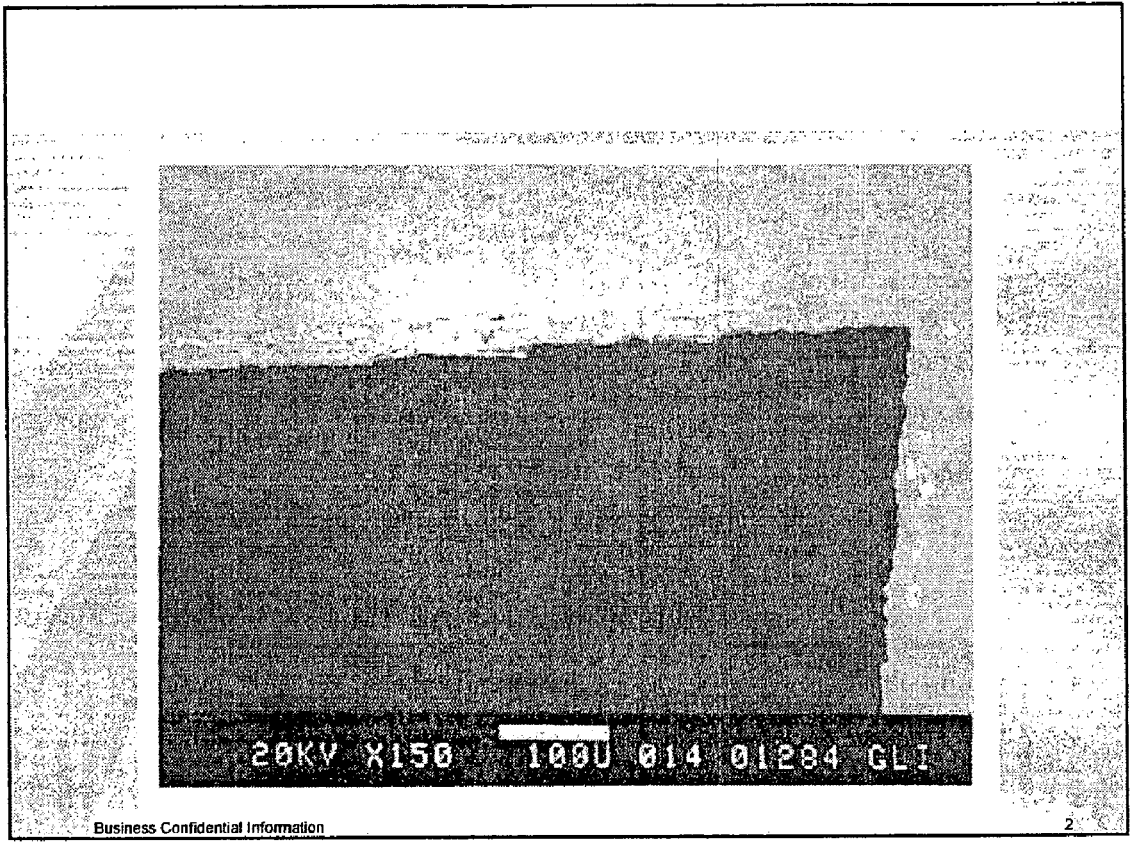
FIG. 13a shows a cross-sectional SEM micrograph of an aluminidized corner within a microchannel.
Figure 13B:
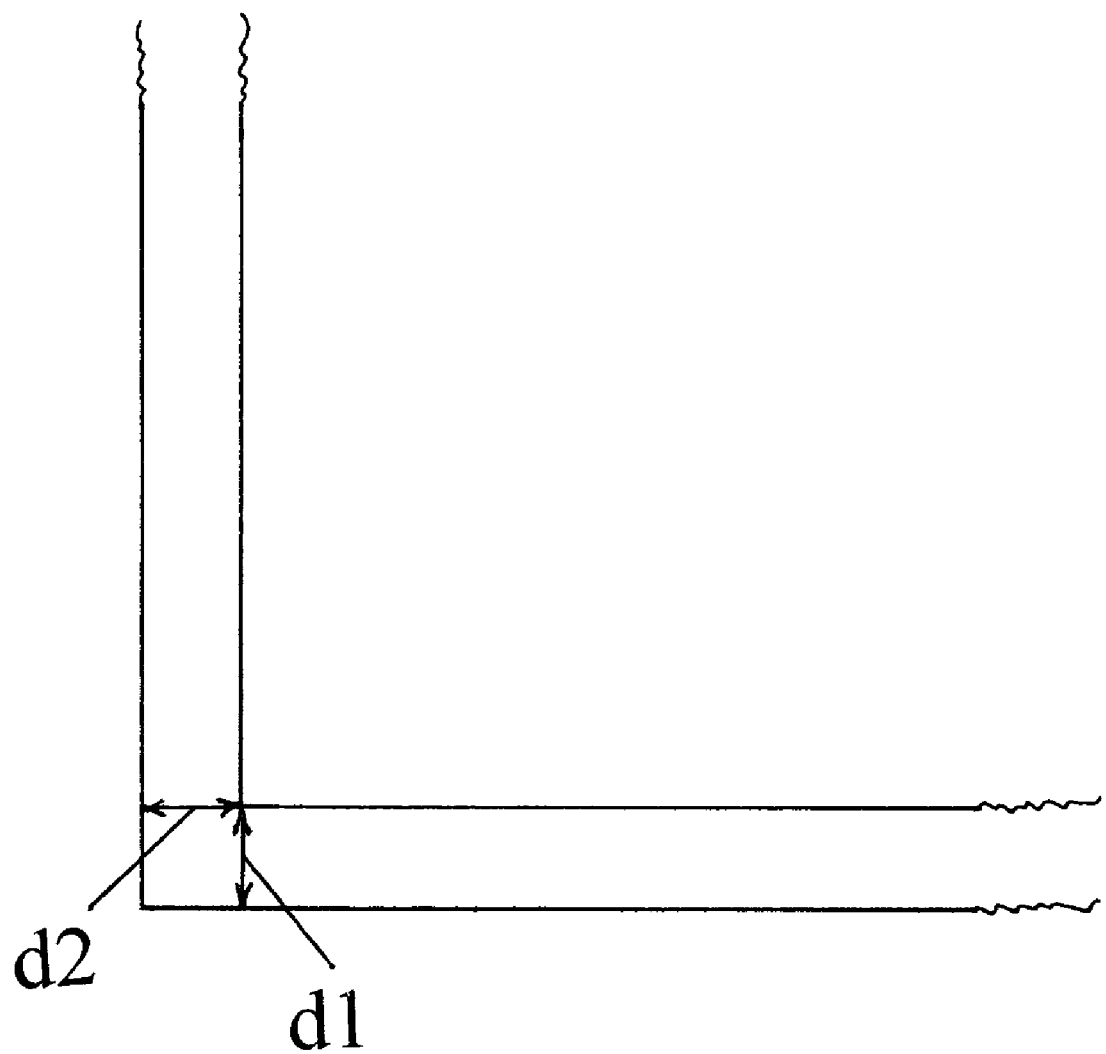
FIG. 13b illustrates distances that can be measured to characterize a corner coating.

Interior corners of microchannel devices were inspected by SEM. These devices were again Inconel™ 617 coated with an aluminide layer. Sharp (90±20°), well-formed corners coated with an aluminde layer were surprisingly found to have conformal coatings (see FIG. 13a) with a sharp angle at the interface between the channel's interior (dark area) and the aluminide coating. For purposes of measuring the angle of the coating, the angle of the coating is based on averaging surface roughness for 100 μm along each edge from the corner. In some preferred embodiments, the angle of the coating is 90±20°, in some preferred embodiments 90±10°. Another measure is the thickness ((d1+d2)/2) of the coating at the perimeter of the corner coating (see FIG. 13b) based on extensions (d1 and d2) of the same 100 μm lines used to measure coating angle; preferably this thickness of the coating at the perimeter of the corner coating is within 25%, more preferably within 10% of either the average coating thickness (averaged over a microchannel wall, or 100 μm microchannel wall segment, terminating at the corner), or within 25%, more preferably within 10% of either the midpoint thickness (measured at the midpoint of a microchannel wall, or microchannel wall segment, terminating at the corner).

Figure 14:
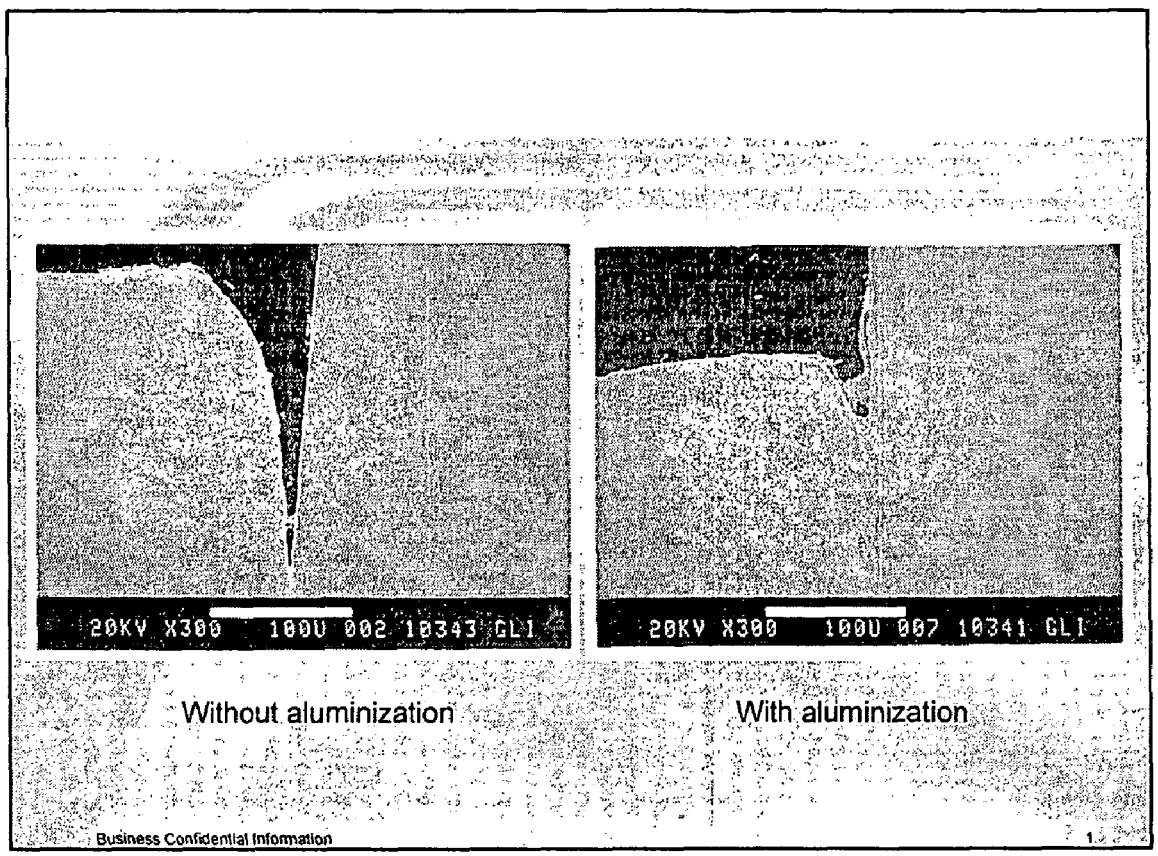
FIG. 14 shows a cross-sectional SEM micrograph of an aluminidized crevice at a microchannel corner.
Figure 15:
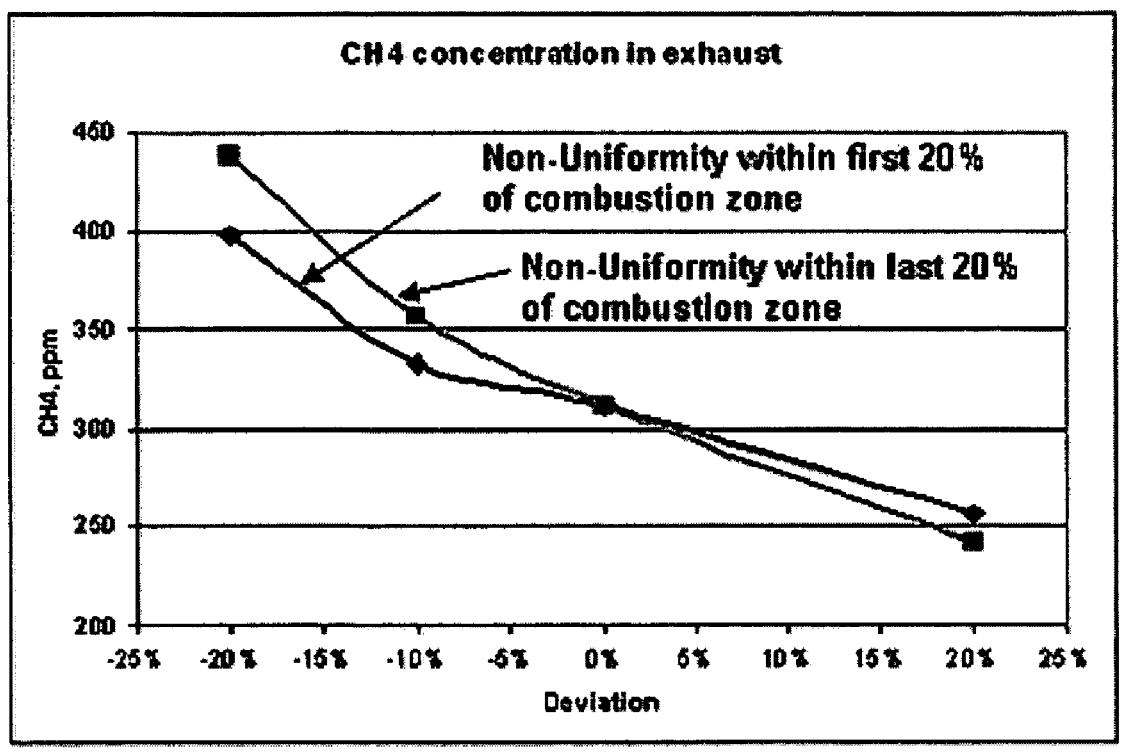
FIG. 15 shows calculated performance of a combustion reaction in selected microchannel apparatus as a function of deviation from uniform coating.

Crack filling is shown in FIG. 14. The Inconel sheets were stamped. The stamping process tends to result in slightly curved edges, and these curved edges can result in gaps at the corners formed between two laminated sheets. The aluminide coating fills this gap, again this occurs in a conformal fashion with the thickness of the coating being uniform with elsewhere on the microchannel up until the point that the gap is filled and the coating can no longer grow. In other words, thickness appears to be limited by distance from the metal substrate.

Multichannel Sol Coated Device

A microchannel test device with 48 sets of channels was prepared with post-assembly coatings and tested. The device was made from sheets of an Inoconel™ Ni-based superalloy. An aluminide layer was formed over the alloy. Then it was oxidized (as described above) to form an alumina layer. Several solution-based coatings were applied. To apply the coatings, the device was oriented on one end (the straight microchannels were oriented parallel to gravity), and, in each step, the liquid was added through an inlet located at the bottom (with respect to gravity), into a manifold and up into the microchannels. The level of liquid in the manifolds was controlled by use of a manometer. The fluid was then drained by gravity and a $N_2$ purge cleared remaining liquid from the microchannels. The nitrogen purge rate exceeded 140 SLPM for the device with 48 process and 48 fuel microchannels. If the distribution were uniform, which it is likely not, the per microchannel flowrate would exceed 2.9 SLPM during the nitrogen purge step. In this example, the thermally grown alumina layer was first treated with a La-containing solution, then an alumina sol (15 wt % alumina), then La-containing solution, and finally a Pt-containing solution (10 wt % solution). The device was then cut into pieces for analysis. The coatings exhibited excellent adhesion with no flaking. Elemental analyses were conducted at 100×, 500× and 2000× magnifications using energy dispersive spectroscopy (EDS) at 20 kV excitation energy. Unless specified otherwise, this is the condition (at 100×, or if 100× is larger than the area available, then the largest available area for SEM) that should be used for elemental analysis of any coatings described herein (recognizing that some modifications may be required if such measurment conditions are impracticable for particular systems). As is well-known, this technique measures the surface composition, as well as some thickness below the surface.

Six channels (two sets of 3 channels) were analyzed. From each set of 3 channels there were 2 channels on an edge of the device and one in the middle. The coatings in the six channels were analyzed at the top and bottom (with respect to gravity during washcoating) of the coated section. The wt % Pt in each channel are shown below:

|  | Channel No. | | | | | |
| --- | --- | --- | --- | --- | --- | --- |
|  | 1 | 2 | 3 | 4 | 5 | 6 |
| top | 42 | 38 | 42 | 25 | 28 | 29 |
| bottom | 46 | 33 | 41 | 52 | 45 | 61 |

As can be seen, there was not a consistent trend in every microchannel. In the second set of microchannels (4, 5, 6) there appears to have been a problem with filling, draining, or both. The second set of channels contained about twice as much coating at the bottom of the channel than at the top. Perhaps, during the washcoating stage, the first set of channels drained efficiently, while the second set did not. There also appeared to be an effect in which the outer microchannels contained more coating, perhaps due to slower draining of these channels. For this data, the variability for one standard deviation exceeds 40% of the mean value for both the top and the bottom of the six channels.

Both interchannel and intrachannel deviation can be described in terms of standard deviations around the mean. Assuming a normal gaussian distribution of catalyst loadings from channel to channel and within a channel, 68% of all channels will be within 1 standard deviation of the mean; 95% of all channels will be within 2 standard deviations of the mean, and 99.7% of all channels will be within 3 standard deviations of the mean.

For another set of analyzed channels, wide variability from channel to channel and along the length of the channel was measured. Channel-to-channel variability of the Pt catalyst for a set of 3 channels analyzed at 4 axial locations had a standard deviation of 2 around a mean of 27% at the tops of the channels. Uniformity to within 1 standard deviation would give an intercahnnel variability of about +/−15%. Uniformity to within 2 standard deviations would give an interchannel variability of about +/−22%. Uniformity to within 3 standard deviations would give an interchannel variability of about +/−45%. The Pt catalyst variability at the bottom of the channel gives a mean of 52% Pt and a standard deviation of 8. Uniformity to within 1 standard deviation would give an intercahnnel variability of about +/−30%. Uniformity from channel to channel at the bottom of the channel to within 2 standard deviations would give an interchannel variability of about +/−61%. Uniformity to within 3 standard deviations at the channel bottom would give an interchannel variability of about +/−92%. In all cases, the degree of Pt catalyst uniformity, as defined to witin 2 standard deviations, exceeds 20% in all cases. The variability is higher at the bottom of the channels as expected because the uniformity is exacerbated by differences in draining from channel to channel. The channels that are closer to the drain ports are expected to drain first and have less material accumulation for longer times than those channels farther away from the drain ports.

The intrachannel variablitity was also quite high for this device. The average variability accross the 3 channels to within 1 standard deviation slightly exceeds 50%. This data then suggests that roughly two-thirds of the channels have a variability near 50%, while one-third of the channels would be expected to have a much larger variability.

The target uniformity for both interchannel and intrachannel catalyst loading is within 20% to achieve the target process performance. Uniformity may be measured by assessing performance to within 2 standard deviations as measured in a device.

The described invention overcomes the coating uniformity challenges observed in this example. Intrachannel uniformity is particularly advantaged when the dominant forces acting on the washcoating fluid are surface forces not gravitational forces. Gravitational forces that acted on the washcoating fluid in this example thinned the top of the retained liquid layer and gave rise to high intrachannel non-uniformity. Surface forces, including capillary, adhesion, or chemical reaction act to retain the fluid evenly or nearly evenly along the channel length. In addition, the described example demonstrated poor interchannel uniformity. The described invention shows that the interchannel uniformity is dominated by the processing methods by which the device is filled and drained with the washcoating solution. One solution is to use capillary features which will hold up the fluid when it arrives at the microchannel wall. This method is less sensitive to the time that a fluid spends elsewhere in the device while filling and draining. With that said, it is anticipated that a gaseous purge less than about 1 SLPM per channel is required to blow out excess material at the end of the microchannel after the draining process. Preferably, the gaseous purge is less than 0.5 SLPM per microchannel. More preferable, the gaseous purge is less than 0.1 LPM per microchannel and in some embodiments is substantially zero. Other surface forces approaches, including adhesion and chemical reaction and electrochemical reactions, may be more susceptible to non-uniformity arising from the filling and draining process. Uniformity will be particularly advantaged, when the fluid is essentially in place or filled within a channel to the desired liquid level before the surface forces act substantially. Conversely, it is desired to reduce the rate of the surface forces prior to removing or draining the washcoating fluid from the microchannel. For both the case of the adhesive or chemical reaction one option would be to fill and drain the channels at a first temperature that is substantially below a second temperature where the washcoating fluid and wall interact or react to deposit or retain washcoating fluid. The second temperature is at least 10 C. higher than the first temperature and preferably 20 C. or more higher. For the case of a chemical reaction, the washcoating fluid may be allowed to react to extinction and thus non-uniform coatings are unlikely during the draining process and no temperature reduction is required during draining. The microchannels containing the washcoating fluid are adjacent to a second set of parallel microchannels that are used during the operation of the chemical process such as a chemical reactor. This second set of microchannels may be particularly advantageous for controlling and maintaining a uniform heating and cooling profile throughout the microchannel device during the filling and draining process. As an example, it would be particularly advantageous to raise the device temperature from the first to the second temperature by flowing a heat exchange fluid from one direction in the adjacent heat exchange microchannel. The transient nature of this process will reveal that the first end of the microchannel that sees the higher temperature heat exchange fluid first and will raise in temperature first. The transient time for moving the average microchannel temperature from the first to the second temperature may be less than 30 minutes, preferably less than 10 minutes, and more preferably less than 1 minute. If the time to raise the temperature of the device is within 10% of the total time required for the surface reaction or adhesion process to retain the fluid on the microchannel wall, then the cool down could be performed in reverse, whereby the heat exchange fluid enters from the second end of the microchannel such that the total time at temperature for both ends of the microchannel is roughly equivalent and thus minimizing interchannel non-uniformity during draining.

Performance calculations were completed for the methane steam reforming design showing the impact of non-uniform coating on the combustion or heat generation microchannel. When the catalyst was more than 20% reduced near either the top or bottom of the channel (as defined by the top 20% or bottom 20% of the channel), then the emissions performance metric (400 ppm or 99.3% methane combustion) could not be achieved. If the performance metric for the reactor were less stringent, then a higher degree of non-uniformity would be allowed.

A relationship between the required approach to theoretical performance and allowable catalyst non-uniformity is challenging to fully assess and has not yet been fully quantified for all reaction cases. Performance metrics include absolute conversion (as in the case of emissions), selectivity (as in the case for partial oxidation reactions), approach to equilibrium conversion (as in the case of methane reforming at pressure or other equilibrium-limited reactions), maximum metal or catalyst temperature (as in the case to prevent a deleterious hot or cold spot in the reactor), thermal strain (as in the case of too active catalyst near a high strain region that might create thermal gradients sufficient to reduce the mechanical integrity or lifetime of a device), among others. It is envisioned that a catalyst uniformity to within 20% should be acceptable for most cases, and a higher degree of catalyst non-uniformity may be allowed in some cases.

Heat Treatments

Figure 16:
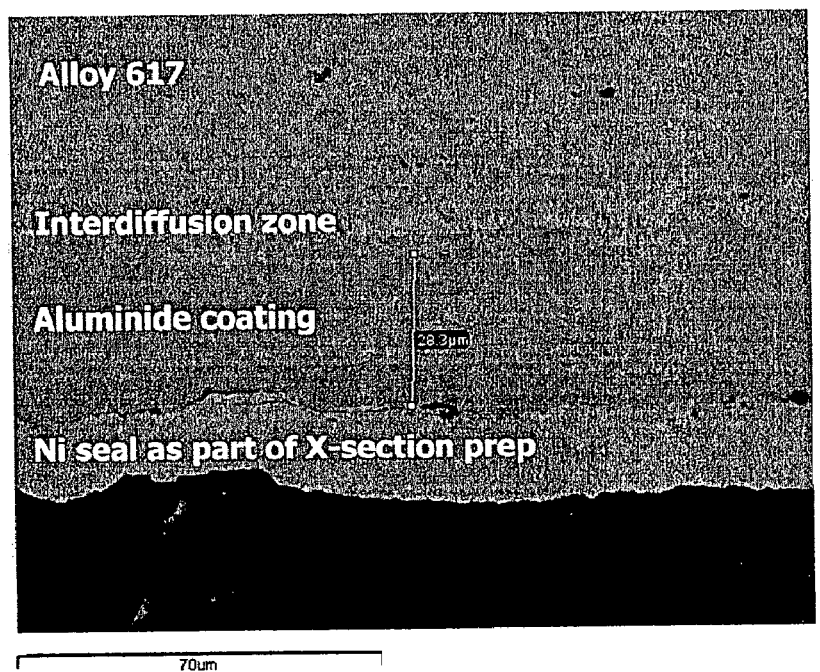
FIG. 16 shows a cross-sectional SEM micrograph of an aluminidized sample of Inconel™ 617.

Inconel™ 617 coupons were aluminidized and heat treated under a variety of conditions. A coupon aluminidized to form the aluminide coating, but not oxidized, is shown in FIG. 16. The aluminide layer was about 30 μm thick and there was an interdiffusion zone between the aluminide layer and the alloy that was about 5 μm thick. The aluminide layer contained 28 to 31 wt % Al which corresponds to NiAl.

Heat treatment of an aluminidized coupon at 1100° C. for 100 hours caused the interdiffusion zone to essentially disappear and there was a substanital loss of aluminum from the aluminide layer into the alloy. Treatment of an aluminidized coupon at 1050° C. for 100 hours did not show significant loss of the aluminide coating.

Effect of Oxide Presence During Aluminidization Process

Figure 17:
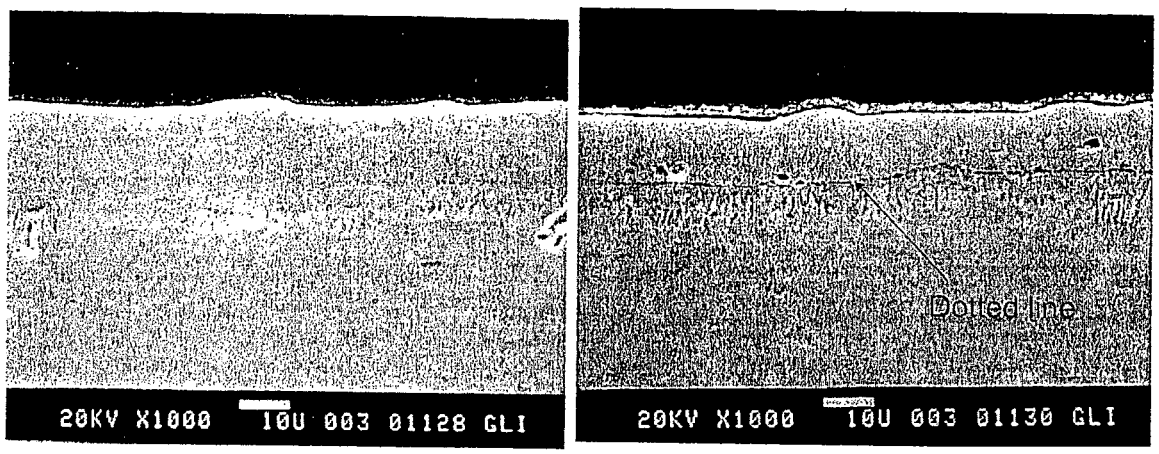
FIG. 17 shows a cross-sectional SEM micrograph of a coupon of Inconel™ 617 that was aluminidized (left), or exposed to air at 400° C. for one hour to grow some surface oxide prior to growing the aluminide layer.

FIG. 17 shows a comparison between a standard aluminidized coupon and a coupon heat treated in air at 400° C. for 1 hr to purposely grow some native oxide of chromia before being aluminidized. A thin dotted line of inclusions in the aluminide is observed in the coupon with native oxide before aluminidization. Such a line of inclusions could become a weak point in terms of adhesion. Reference to these figures should be taken when deciding whether an aluminide layer is substantially with or without oxide defects between an aluminide layer and a metal substrate.

Figure 18:
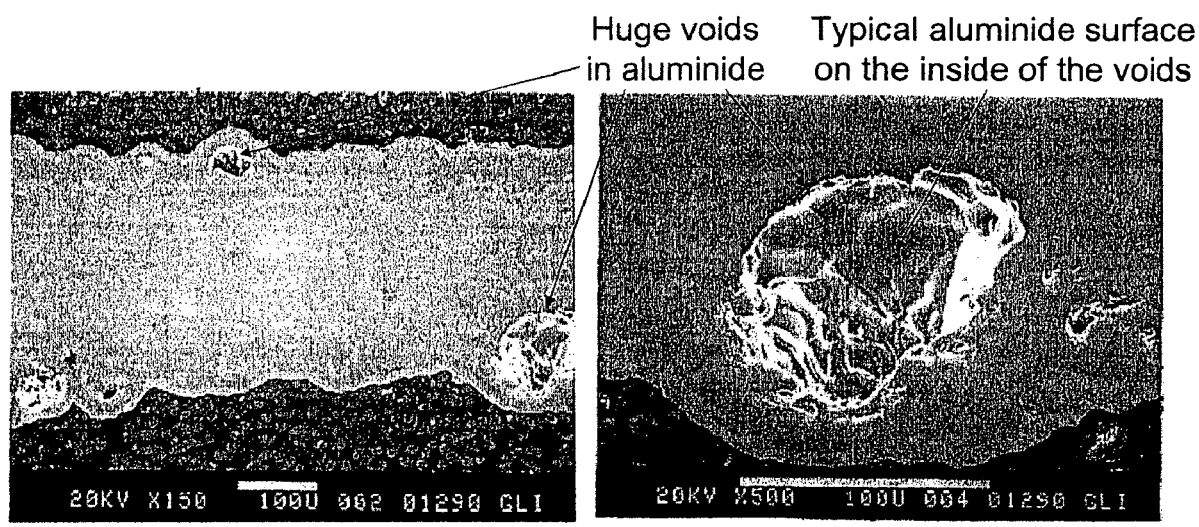
FIG. 18 shows a cross-sectional SEM micrograph of a coupon of Inconel™ 617 that was aluminidized in the presence of alumina disks.

Coating defects were also observed on FeCrAlY fins that were aluminidized in the presence of an alumina disk. FIG. 18 shows large voids in the aluminide layer of an Inconel™ 617 coupon that was aluminidized in the presence of an alumina disk.

In early attempts at the aluminidization of a multichannel device, it was discovered that the channels nearest the gas inlet (that is, the inlet for the aluminum compounds) showed the most inclusions while the channels furthest away showed the least. This is believed to have been caused by surface oxides in the tubing or manifolding in the pathway of the aluminum compounds prior to the microchannels. The presence of surface oxide in the tubing was confirmed by EDS. To avoid these defects, care should be taken to avoid the use of components that have surface oxides in the aluminidization process, especially surface oxides along the fluid pathway (that is, the pathway carrying aluminum compounds) leading to a microchannel device. In some preferred techniques, the tubing and/or other fluid pathways are subjected to a treatment to remove surface oxides (brightened), such as by a hydrogen treatment. Of course, before aluminidization, the microchannels may also be subjected to a treatment for the removal of surface oxide.

In preferred embodiments, the aluminide layer and the interfaces of the aluminide layer with the alloy substrate and an oxide layer (if present) is preferably substantially without voids or inclusions that are larger than 10 μm, more preferably substantially without voids or inclusions that are larger than 3 μm. "Substantially without voids or inclusions" excludes coatings such as shown in FIG. 14 and other structures having numerous (that is, more than about 5 large or a single very large) defects in 50 μm of length along a channel, but wouldn't exclude a structure shown on the left of FIG. 13 that shows a small number of isolated defects.

Example

Comparative uptake and reaction performance tests were conducted with a flat microchannel compared to a microchannel with capillary features recessed within the wall. The capillary features are also referred to as microfins in this example. The tests were conducted for a combustion reaction. The capillary features were un-optimized in this example and unpreferably vertically oriented with the direction of gravity and process flow.

Testing was conducted with combustion catalyst formulations in both test devices. The first test device was a 2" long 0.5" diameter Inconnel 617 rod with a 0.375" by 0.045" axial slot flat microchannel cut within it using wire EDM. The second test device was a 2" long 0.5" diameter rod with a 0.375" by 0.045" axial microchannel that also had 20 axial capillary features (group in two sets of 10 separated by a large central rib) that were 0.010" deep by 0.012" wide and separated by 0.004" ribs. The axial capillary features gave the second test device 40% more geometric surface area than the first test device. Each test device was heat treated to produce a chromia scale and catalyst was wash coated on to the interior surfaces. For each device there were 7 washcoating steps of 15 wt %/o alumina sol, followed by 1 washcoating step of 10 wt % Pr and 2 washcoating steps of 10 wt % Pt. Total uptake of catalyst on the first device (flat microchannel) was measured to be 7.9 mg/in$^2$. Total uptake of catalyst on the second device with capillary features was measured to be 14 mg/in$^2$ (an increase of more than 77% or 1.77×). Each test device received the same number of sol alumina and active metal wash coats. When methane combustion (2% methane, 15% excess air, 10% steam, balance nitrogen) was conducted it was found that the steady state conversion of methane in the microchannel with capillary features was 2.4 times as great as that in the first flat microreactor without any surface or capillary features. The initial conversion was 1.24× higher with the microchannel with capillary features than for the flat microchannel. The deactivation rate was substantially more pronouced for the flat microchannel over the capillary-featured microchannel. It is theorized that the catalyst on the flat microchannel sees a higher wall shear stress resulting from the high gas velocity flowing past the flat wall. The average velocity for the flat microchannel exceeds 100 m/s for this example. The resulting shear stress for the calculated laminar flow exceeds 6 Pa, as defined by the product of the viscosity and the velocity gradient normal to the direction of flow. The expected wall shear stress within the capillary feature is expected to be less than 1 Pa as very little flow is expected within the recessed capillary feature. As the temperature of the coating increases from the exothermic combustion reaction, the resulting material stress between the coating and the wall (each material with very different coefficients of thermal expansion) may make the coating more prone to cracks and flaking—thus exacerbating the catalyst deactivation resulting from loss of material. Correspondingly, the catalyst retained within the capillary feature does not see as high of a wall shear stress and thus is less likely to undergo flaking even though the expected temperature in the catalyst coating is higher because the methane conversion and thus heat release is higher. Further, the coating in the capillary feature has more surface area and the base metal structure upon which the coating sits is stiffer, thus the coating will be stronger in tension. The CTE mismatch between the microchannel metal wall and the alumina coating will put the coating into tension at the elevated temperature and thus prone to cracks. It should also be noted that the metal microchannel in this example was not aluminidized, but rather contained an alumina sol washcoated directly onto a heat treated surface. The aluminidized channel is theorized to create a graded material from the bulk metal to the ceramic overlaying coating wherein the CTE mismatch issue is minimized by the graded coefficient of thermal expansion. The resulting ceramic coatings applied over an aluminized surface are theorized to be stronger in tension and less prone to crack formation.

Figure 19:
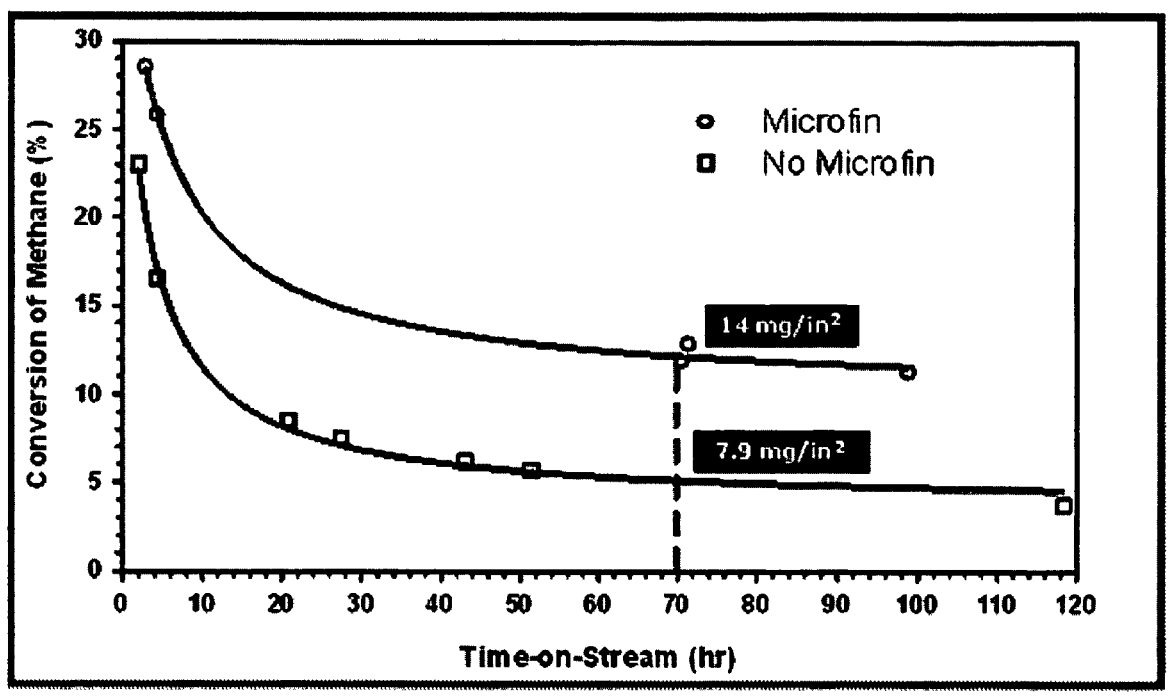
FIG. 19 illustrates results of methane steam reforming comparing washcoated channels with (○) and without (□) capillary features.

The experimental results are shown in FIG. 19. The total reactant flowrate was 19 SLPM and the temperature was 800 C. The relative amount of increase in performance (2.4×) exceeded the measured amount of surface catalyst loading (1.7×) and also exceded the amount of increase in geometric surface area (1.4×). Further, the increase in residence time if all the volume of the capillary features is open for flow is 1.14×. Model predictions were done where an assumed uniform coating was created on all capillary features and the intervening flat walls and ribs; for this calculation a predicted conversion improvement of 2% (1.02×) was calculated. This predicted enhancement was quite low compared to actual as a result of higher catalyst loading in the capillary features and possibly a higher than calculated effectiveness factor for area found within the capillary features. It is further theorized that capillary features act to create stagnant areas for flow such that a residence time distribution is created in the microchannel. The reactant molecule on average has slightly more time to react in the device that contains capillary features because the reactant molecules may not be convectively swept away from the bulk flow microchannel during the short contact time operation.

Capillary features demonstrated surprisingly superior results as compared with identically prepared channels without capillary features.

In preferred embodiments of the invention, washcoating produces 0.5 mg/cm$^2$ or more increase in coating thickness, more preferably 1 mg/cm$^2$ or more, as compared with washcoating a microchannel under identical conditions except without capillary features. In this case, cm$^2$ refers to the geometric surface area of the channel before coating and this value does not count the extra area provided by the capillary features.

We claim:

1. Microchannel apparatus, comprising:
   an interior microchannel comprising a microchannel wall;
   a contiguous post-assembly coating along a contiguous length of at least 1 cm of the microchannel wall;
   wherein the contiguous post-assembly coating has a contiguous length of at least 1 cm that has an average thickness measured perpendicular to the microchannel length and in the direction in which a coating grows away from the wall of at least 5 μm and wherein at least 90% of the contiguous length of coating is within +/−20% of the average thickness.

2. The microchannel apparatus of claim 1 wherein the contiguous post-assembly coating has a contiguous length of at least 1 cm that has an average thickness measured perpendicular to the microchannel length and in the direction in which a coating grows away from the wall of at least 15 μm and wherein at least 90% of the contiguous length of coating is within +/−3 μm of the average thickness.

3. A method of conducting a unit operation, comprising:
   passing a fluid into the interior microchannel of the apparatus of claim 1; and
   conducting a unit operation on the fluid in the interior microchannel.

4. The method of claim 3 wherein the interior microchannel comprises a catalytic material, and wherein the microchannel apparatus of claim 1 is a reactor, and wherein the unit operation comprises a chemical reaction.

5. The microchannel apparatus of claim 1 wherein the interior microchannel is a complex microchannel;
   wherein the complex microchannel includes one or more of the following characteristics: at least one contiguous microchannel having a turn of at least 45°; a length of 50 cm or more; a length of 20 cm or more along with a dimension of 2 mm or less; the microchannel is in a group of at least 2 adjacent channels, having an adjacent length of at least one cm, that are connected by plural orifices along a common microchannel wall where the area of orifices amounts to 20% or less of the area of the microchannel wall in which the orifices are located and where each orifice is 2 mm$^2$ or smaller; or the microchannel is in a group of at least two parallel microchannels having a length of at least 1 cm, that have openings to an integral manifold, where the manifold includes at least one dimension that is no more than three times the minimum dimension of the parallel microchannels.

6. Microchannel apparatus, comprising:
   an interior, complex microchannel comprising a microchannel wall;
   a contiguous post-assembly coating along a contiguous length of at least 1 cm of the microchannel wall;
   wherein the contiguous post-assembly coating has a contiguous length of at least 1 cm that has an average thickness measured perpendicular to the microchannel length and in the direction in which a coating grows away from the wall of at least 1 μm and wherein at least 90% of the contiguous length of coating is within +/−20% of the average thickness;
   wherein the complex microchannel includes one or more of the following characteristics: at least one contiguous microchannel having a turn of at least 45°; a length of 50 cm or more; a length of 20 cm or more along with a dimension of 2 mm or less; the microchannel is in a group of at least 2 adjacent channels, having an adjacent length of at least one cm, that are connected by plural orifices along a common microchannel wall where the area of orifices amounts to 20% or less of the area of the microchannel wall in which the orifices are located and where each orifice is 2mm$^2$ or smaller; or the microchannel is in a group of at least two parallel microchannels having a length of at least 1 cm, that have openings to an integral manifold, where the manifold includes at least one dimension that is no more than three times the minimum dimension of the parallel microchannels.

7. Microchannel apparatus, comprising:
   an interior microchannel comprising a microchannel wall;
   a contiguous post-assembly alumina coating along a contiguous length of at least 1 cm of the microchannel wall;
   wherein the contiguous post-assembly coating has a contiguous length of at least 1 cm that has an average thickness 'measured perpendicular to the microchannel length and in the direction in which a coating grows away from the wall' of at least 1 μm and wherein at least 90% of the contiguous length of coating is within +/−20% of the average thickness.

8. The microchannel apparatus of claim 1 wherein the contiguous post-assembly coating has a contiguous length of at least 20 cm.

9. The microchannel apparatus of claim 1 wherein the contiguous post-assembly coating has a contiguous length of at least 1 cm that has an average thickness (measured perpendicular to the microchannel length and in the direction in which a coating grows away from the wall) of at least 5 μm and wherein at least 95% of the contiguous length of coating is within +/−10% of the average thickness.

10. The microchannel apparatus of claim 6 wherein the contiguous post-assembly coating has a contiguous length of at least 1 cm that has an average thickness measured perpendicular to the microchannel length and in the direction in which a coating grows away from the wall of at least 5 μm and wherein at least 95% of the contiguous length of coating is within +/−10% of the average thickness.

11. The microchannel apparatus of claim 7 wherein the contiguous post-assembly coating has a contiguous length of at least 1 cm that has an average thickness (measured perpendicular to the microchannel length and in the direction in which a coating grows away from the wall) of at least 5 μm and wherein at least 95% of the contiguous length of coating is within +/−10% of the average thickness.

12. The microchannel apparatus of claim 1 wherein the contiguous post-assembly coating is an aluminide layer.

13. The microchannel apparatus of claim 7 wherein the interior microchannel is a complex microchannel;
wherein the complex microchannel includes one or more of the following characteristics: at least one contiguous microchannel having a turn of at least 45°; a length of 50 cm or more; a length of 20 cm or more along with a dimension of 2 mm or less; the microchannel is in a group of at least 2 adjacent channels, having an adjacent length of at least one cm, that are connected by plural orifices along a common microchannel wall where the area of orifices amounts to 20% or less of the area of the microchannel wall in which the orifices are located and where each orifice is 2 mm² or smaller; or the microchannel is in a group of at least two parallel microchannels having a length of at least 1 cm, that have openings to an integral manifold, where the manifold includes at least one dimension that is no more than three times the minimum dimension of the parallel microchannels.

14. The microchannel apparatus of claim 5 wherein the microchannel apparatus comprises at least 2 adjacent channels, having an adjacent length of at least one cm, that are connected by plural orifices along a common microchannel wall where the area of the orifices amounts to 20% or less of the area of the microchannel wall in which the orifices are located and wherein each orifice is 1 mm² or smaller, wherein the contiguous post-assembly coating is disposed along the common microchannel wall.

15. The microchannel apparatus of claim 6 wherein the microchannel apparatus comprises at least 2 adjacent channels, having an adjacent length of at least one cm, that are connected by plural orifices along a common microchannel wall where the area of the orifices amounts to 20% or less of the area of the microchannel wall in which the orifices are located and wherein each orifice is 1 mm² or smaller, wherein the contiguous post-assembly coating is disposed along the common microchannel wall.

16. The microchannel apparatus of claim 5 wherein the complex microchannel comprises a turn of at least 90° and a length of 2 mm or less along with a dimension of 2 mm or less.

17. The microchannel apparatus of claim 6 wherein the complex microchannel comprises a turn of at least 90°.

18. The microchannel apparatus of claim 17 wherein the complex microchannel comprises a length of 2 mm or less along with a dimension of 2 mm or less.

19. The microchannel apparatus of claim 1 wherein the post-assembly coating is formed by electroless plating.

20. The microchannel apparatus of claim 6 wherein the post-assembly coating is formed by electroless plating.

* * * * *